US011516513B2

United States Patent
Chen et al.

(10) Patent No.: US 11,516,513 B2
(45) Date of Patent: Nov. 29, 2022

(54) METHOD AND APPARATUS OF OPTIMIZED SPLITTING STRUCTURE FOR VIDEO CODING

(71) Applicant: MEDIATEK INC., Hsinchu (TW)

(72) Inventors: Chun-Chia Chen, Hsinchu (TW); Chia-Ming Tsai, Hsinchu (TW); Yu-Chi Su, Hsinchu (TW); Chen-Yen Lai, Hsinchu (TW); Chih-Wei Hsu, Hsinchu (TW); Ching-Yeh Chen, Hsinchu (TW); Tzu-Der Chuang, Hsinchu (TW); Yu-Wen Huang, Hsinchu (TW); Han Huang, San Jose, CA (US)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/977,158

(22) PCT Filed: Mar. 13, 2019

(86) PCT No.: PCT/CN2019/077960
§ 371 (c)(1),
(2) Date: Sep. 1, 2020

(87) PCT Pub. No.: WO2019/174594
PCT Pub. Date: Sep. 19, 2019

(65) Prior Publication Data
US 2021/0014536 A1      Jan. 14, 2021

Related U.S. Application Data

(60) Provisional application No. 62/664,382, filed on Apr. 30, 2018, provisional application No. 62/647,917, (Continued)

(51) Int. Cl.
*H04N 19/70*      (2014.01)
*H04N 19/174*     (2014.01)
(Continued)

(52) U.S. Cl.
CPC .......... *H04N 19/70* (2014.11); *H04N 19/174* (2014.11); *H04N 19/647* (2014.11); *H04N 19/66* (2014.11); *H04N 19/89* (2014.11)

(58) Field of Classification Search
CPC ....... H04N 19/174; H04N 19/70; H04N 19/89
See application file for complete search history.

(56) References Cited

U.S. PATENT DOCUMENTS

| 9,912,944 B2 | 3/2018 | Guo et al. |
| 2008/0062018 A1 | 3/2008 | Normile et al. |
| | | (Continued) |

FOREIGN PATENT DOCUMENTS

| CN | 104285447 A | 1/2015 |
| WO | 2014/166340 A1 | 10/2014 |
| | (Continued) | |

OTHER PUBLICATIONS

International Search Report and Written Opinion dated May 29, 2019, issued in application No. PCT/CN2019/077960.
(Continued)

*Primary Examiner* — Zhubing Ren
(74) *Attorney, Agent, or Firm* — McClure, Qualey & Rodack, LLP

(57) ABSTRACT

In one method, the current block is partitioned into multiple final sub-blocks using one or more stages of sub-tree partition comprising ternary tree partition and at least one other-type partition, where ternary partition tree is excluded from the sub-tree partition if a current sub-tree depth associated with a current sub-block is greater than a first threshold and the first threshold is an integer greater than or equal to 1. In another method, if a test condition is satisfied, the current block is encoded or decoded using a current Inter mode selected from a modified group of Inter tools, where the modified group of Inter tools is derived from an initial (Continued)

group of Inter tools by removing one or more first Inter tools from the initial group of Inter tools, replacing one or more second Inter tools with one or more complexity-reduced Inter tools, or both.

5 Claims, 13 Drawing Sheets

Related U.S. Application Data filed on Mar. 26, 2018, provisional application No. 62/647,914, filed on Mar. 26, 2018, provisional application No. 62/647,910, filed on Mar. 26, 2018, provisional application No. 62/642,661, filed on Mar. 14, 2018.

(51) Int. Cl.
*H04N 19/64* (2014.01)
*H04N 19/66* (2014.01)
*H04N 19/89* (2014.01)

(56) References Cited

U.S. PATENT DOCUMENTS

| | | | |
|---|---|---|---|
| 2013/0187798 A1 | 7/2013 | Marpe et al. | |
| 2017/0208336 A1* | 7/2017 | Li | H04N 19/105 |
| 2017/0347128 A1 | 11/2017 | Panusopone et al. | |
| 2018/0020241 A1* | 1/2018 | Li | H04N 19/50 |
| 2018/0070110 A1* | 3/2018 | Chuang | H04N 19/593 |
| 2018/0199072 A1* | 7/2018 | Li | H04N 19/122 |
| 2019/0149823 A1* | 5/2019 | Lim | H04N 19/124 |
| | | | 375/240.03 |
| 2019/0166367 A1* | 5/2019 | Zhao | H04N 19/176 |
| 2019/0364279 A1* | 11/2019 | Yasugi | H04N 19/176 |
| 2020/0162729 A1* | 5/2020 | Lee | H04N 19/176 |
| 2020/0213590 A1* | 7/2020 | Kim | H04N 19/18 |
| 2020/0288150 A1* | 9/2020 | Jun | H04N 19/176 |

FOREIGN PATENT DOCUMENTS

| | | |
|---|---|---|
| WO | 2015/136485 A1 | 9/2015 |
| WO | 2018/028615 A1 | 2/2018 |

OTHER PUBLICATIONS

Chinese language office action dated Mar. 13, 2020, issued in application No. TW 108108582.
European Search Report dated Dec. 1, 2021, issued in application No. EP 19766852.8.
Bordes, P., et al.; "Description of SDR, HDR and 360° video coding technology proposal by Qualcomm and Technicolor—medium complexity version;" Joint Video Experts Team (JVET) of ITU-T SG 16 WP 3 and ISO/IEC JTC 1/SC 29/WG 11; Apr. 2018; pp. 1-81.

* cited by examiner

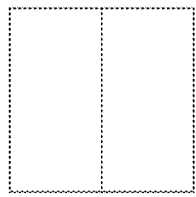
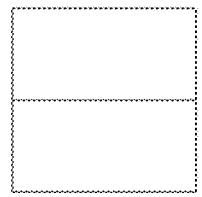
M/2xM
Symmetric vertical splitting
M/2xM
Symmetric horizontal splitting
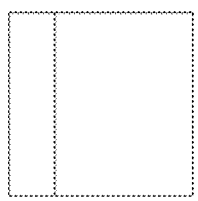
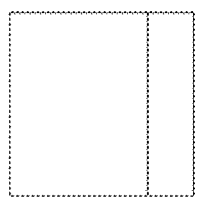
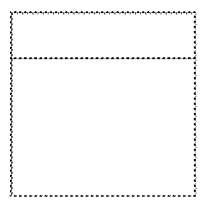
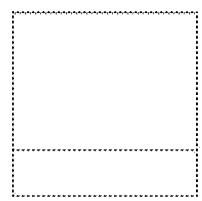
M/4xM (L)   M/4xM (R)   MxM/4 (U)   MxM/4 (D)
*Fig. 3*
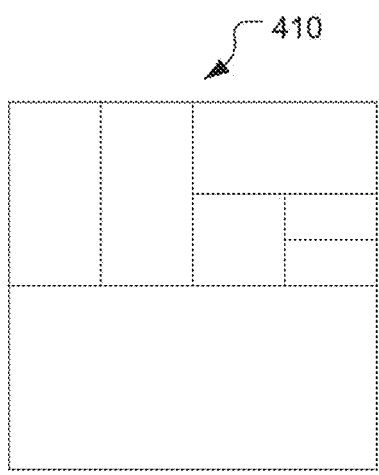
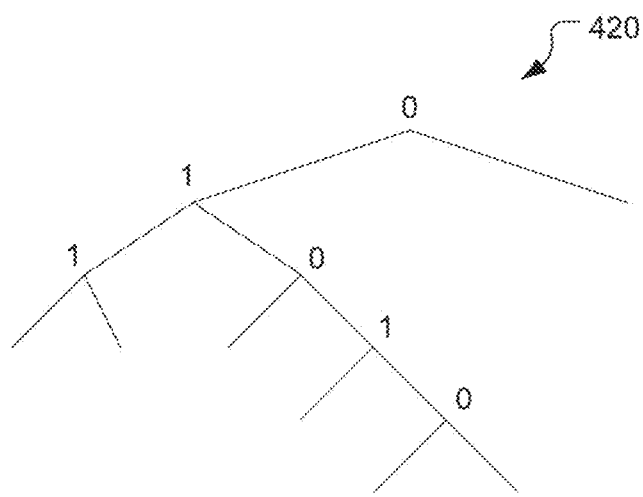
*Fig. 4*

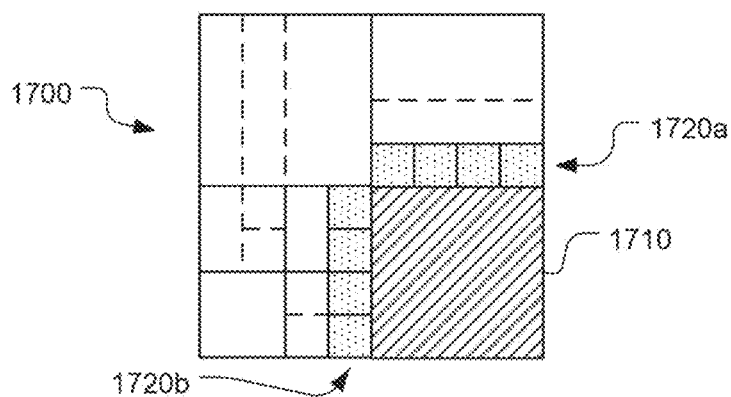
*Fig. 17*
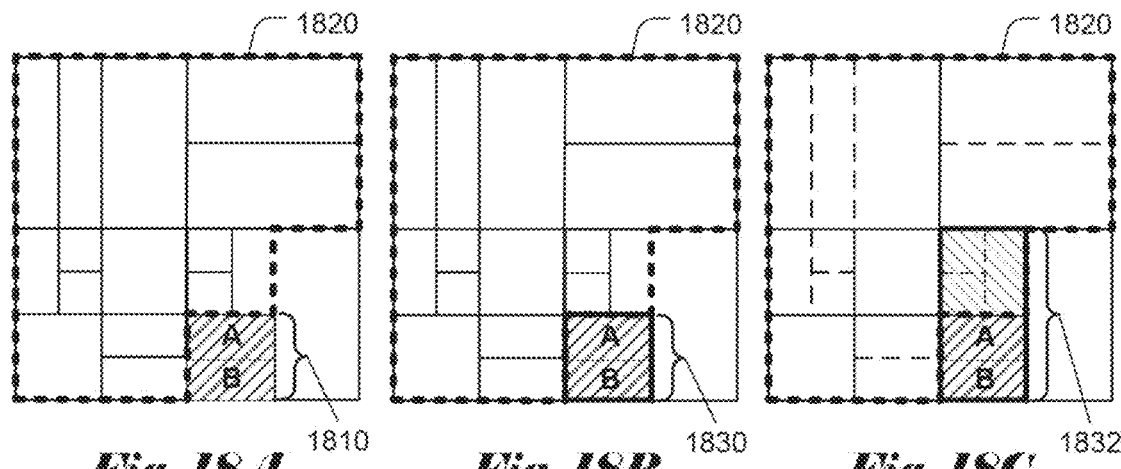
*Fig. 18A*  *Fig. 18B*  *Fig. 18C*
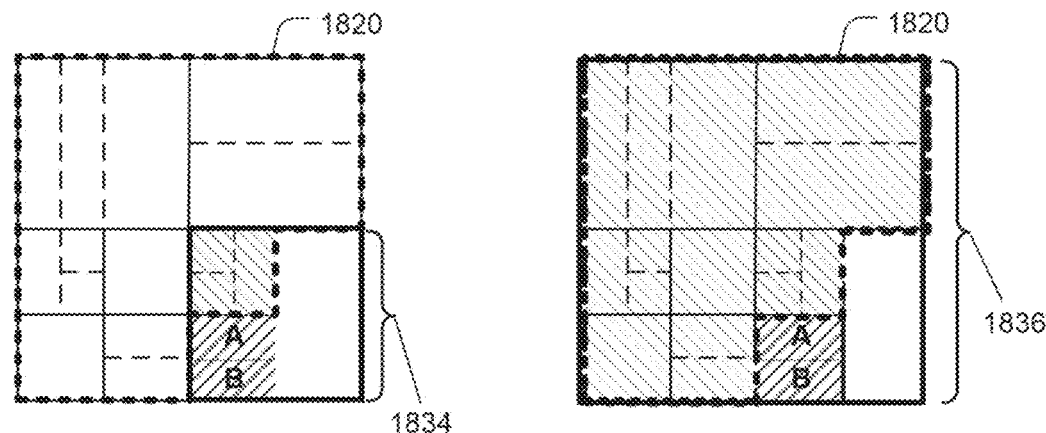
*Fig. 18D*  *Fig. 18E*

METHOD AND APPARATUS OF OPTIMIZED SPLITTING STRUCTURE FOR VIDEO CODING

CROSS REFERENCE TO RELATED APPLICATIONS

The present invention claims priority to U.S. Provisional Patent Applications, Ser. No. 62/642,661 filed on Mar. 14, 2018, U.S. Provisional Patent Applications, Ser. No. 62/647,910 filed on Mar. 26, 2018, U.S. Provisional Patent Applications, Ser. No. 62/647,914 filed on Mar. 26, 2018, 2018, U.S. Provisional Patent Applications, Ser. No. 62/647,917 filed on Mar. 26, 2018 and U.S. Provisional Patent Applications, Ser. No. 62/664,382 filed on Apr. 30, 2018. The U.S. Provisional Patent Applications are hereby incorporated by reference in their entireties.

FIELD OF THE INVENTION

The present invention relates to video coding using the flexible block partition types and/or Inter mode. In particular, the present invention discloses methods to reduce complexity by restricting coding-tree partition if a certain test condition is met. In another aspect, the complexity of Inter tools is reduced if a certain test condition is met.

BACKGROUND AND RELATED ART

The High Efficiency Video Coding (HEVC) standard is developed under the joint video project of the ITU-T Video Coding Experts Group (VCEG) and the ISO/IEC Moving Picture Experts Group (MPEG) standardization organizations, and is especially with partnership known as the Joint Collaborative Team on Video Coding (JCT-VC). In HEVC, one slice is partitioned into multiple coding tree units (CTU). In main profile, the minimum and the maximum sizes of CTU are specified by the syntax elements in the sequence parameter set (SPS). The allowed CTU size can be 8×8, 16×16, 32×32, or 64×64. For each slice, the CTUs within the slice are processed according to a raster scan order.

The CTU is further partitioned into multiple coding units (CU) to adapt to various local characteristics. A quadtree, denoted as the coding tree, is used to partition the CTU into multiple CUs. Let CTU size be M×M, where M is one of the values of 64, 32, or 16. The CTU can be a single CU (i.e., no splitting) or can be split into four smaller units of equal sizes (i.e., M/2×M/2 each), which correspond to the nodes of the coding tree. If units are leaf nodes of the coding tree, the units become CUs. Otherwise, the quadtree splitting process can be iterated until the size for a node reaches a minimum allowed CU size as specified in the SPS (Sequence Parameter Set). This representation results in a recursive structure as specified by a coding tree (also referred to as a partition tree structure) 120 in FIG. 1. The CTU partition 110 is shown in FIG. 1, where the solid lines indicate CU boundaries. The decision whether to code a picture area using Inter-picture (temporal) or Intra-picture (spatial) prediction is made at the CU level. Since the minimum CU size can be 8×8, the minimum granularity for switching between different basic prediction types is 8×8.

Furthermore, according to HEVC, each CU can be partitioned into one or more prediction units (PU). Coupled with the CU, the PU works as a basic representative block for sharing the prediction information. Inside each PU, the same prediction process is applied and the relevant information is transmitted to the decoder on a PU basis. A CU can be split into one, two or four PUs according to the PU splitting type. HEVC defines eight shapes for splitting a CU into PU as shown in FIG. 2, including 2N×2N, 2N×N, N×2N, N×N, 2N×nU, 2N×nD, nL×2N and nR×2N partition types. Unlike the CU, the PU may only be split once according to HEVC. The partitions shown in the second row correspond to asymmetric partitions, where the two partitioned parts have different sizes.

After obtaining the residual block by the prediction process based on PU splitting type, the prediction residues of a CU can be partitioned into transform units (TU) according to another quadtree structure which is analogous to the coding tree for the CU as shown in FIG. 1. The solid lines indicate CU boundaries and dotted lines indicate TU boundaries. The TU is a basic representative block having residual or transform coefficients for applying the integer transform and quantization. For each TU, one integer transform having the same size to the TU is applied to obtain residual coefficients. These coefficients are transmitted to the decoder after quantization on a TU basis.

The terms coding tree block (CTB), coding block (CB), prediction block (PB), and transform block (TB) are defined to specify the 2-D sample array of one colour component associated with CTU, CU, PU, and TU, respectively. Thus, a CTU consists of one luma CTB, two chroma CTBs, and associated syntax elements. A similar relationship is valid for CU, PU, and TU. The tree partitioning is generally applied simultaneously to both luma and chroma, although exceptions apply when certain minimum sizes are reached for chroma.

Alternatively, a binary tree block partitioning structure is proposed in JCTVC-P1005 (D. Flynn, et al, "HEVC Range Extensions Draft 6", Joint Collaborative Team on Video Coding (JCT-VC) of ITU-T SG 16 WP 3 and ISO/IEC JTC 1/SC 29/WG 11, 16th Meeting: San Jose, US, 9-17 Jan. 2014, Document: JCTVC-P1005). In the proposed binary tree partitioning structure, a block can be recursively split into two smaller blocks using various binary splitting types as shown in FIG. 3. The most efficient and simplest ones are the symmetric horizontal and vertical split as shown in the top two splitting types in FIG. 3. For a given block of size M×N, a flag is signalled to indicate whether the given block is split into two smaller blocks. If yes, another syntax element is signalled to indicate which splitting type is used. If the horizontal splitting is used, the given block is split into two blocks of size M×N/2. If the vertical splitting is used, the given block is split into two blocks of size M/2×N. The binary tree splitting process can be iterated until the size (width or height) for a splitting block reaches a minimum allowed block size (width or height). The minimum allowed block size can be defined in high level syntax such as SPS. Since the binary tree has two splitting types (i.e., horizontal and vertical), the minimum allowed block width and height should be both indicated. Non-horizontal splitting is implicitly implied when splitting would result in a block height smaller than the indicated minimum. Non-vertical splitting is implicitly implied when splitting would result in a block width smaller than the indicated minimum. FIG. 4 illustrates an example of block partitioning 410 and its corresponding binary tree 420. In each splitting node (i.e., non-leaf node) of the binary tree, one flag is used to indicate which splitting type (horizontal or vertical) is used, where 0 may indicate horizontal splitting and 1 may indicate vertical splitting.

The binary tree structure can be used for partitioning an image area into multiple smaller blocks such as partitioning a slice into CTUs, a CTU into CUs, a CU into PUs, or a CU into TUs, and so on. The binary tree can be used for partitioning a CTU into CUs, where the root node of the binary tree is a CTU and the leaf node of the binary tree is CU. The leaf nodes can be further processed by prediction and transform coding. For simplification, there is no further partitioning from CU to PU or from CU to TU, which means CU equal to PU and PU equal to TU. Therefore, in other words, the leaf node of the binary tree is the basic unit for prediction and transforms coding.

Binary tree structure is more flexible than quadtree structure since more partition shapes can be supported, which is also the source of coding efficiency improvement. However, the encoding complexity will also increase in order to select the best partition shape. In order to balance the complexity and coding efficiency, a method to combine the quadtree and binary tree structure, which is also called as quadtree plus binary tree (QTBT) structure, has been disclosed. According to the QTBT structure, a block is firstly partitioned by a quadtree structure and the quadtree splitting can be iterated until the size for a splitting block reaches the minimum allowed quadtree leaf node size. If the leaf quadtree block is not larger than the maximum allowed binary tree root node size, it can be further partitioned by a binary tree structure and the binary tree splitting can be iterated until the size (width or height) for a splitting block reaches the minimum allowed binary tree leaf node size (width or height) or the binary tree depth reaches the maximum allowed binary tree depth. In the QTBT structure, the minimum allowed quadtree leaf node size, the maximum allowed binary tree root node size, the minimum allowed binary tree leaf node width and height, and the maximum allowed binary tree depth can be indicated in the high level syntax such as in SPS. FIG. 5 illustrates an example of block partitioning 510 and its corresponding QTBT 520. The solid lines indicate quadtree splitting and dotted lines indicate binary tree splitting. In each splitting node (i.e., non-leaf node) of the binary tree, one flag indicates which splitting type (horizontal or vertical) is used, 0 may indicate horizontal splitting and 1 may indicate vertical splitting.

The above QTBT structure can be used for partitioning an image area (e.g. a slice, CTU or CU) into multiple smaller blocks such as partitioning a slice into CTUs, a CTU into CUs, a CU into PUs, or a CU into TUs, and so on. For example, the QTBT can be used for partitioning a CTU into CUs, where the root node of the QTBT is a CTU which is partitioned into multiple CUs by a QTBT structure and the CUs are further processed by prediction and transform coding. For simplification, there is no further partitioning from CU to PU or from CU to TU. That means CU equal to PU and PU equal to TU. Therefore, in other words, the leaf node of the QTBT structure is the basic unit for prediction and transform.

For I-slice, the QTBT tree structure usually applied with the luma/chroma separate coding. For example, the QTBT tree structure is applied separately to luma and chroma components for I-slice, and applied simultaneously to both luma and chroma (except when certain minimum sizes being reached for chroma) for P- and B-slices. In other words, in an I-slice, the luma CTB has its QTBT-structured block partitioning and the two chroma CTBs have another QTBT-structured block partitioning. In another example, the two chroma CTBs can also have their own QTBT-structured block partitions.

For block-based coding, there is always a need to partition an image into blocks (e.g. CUs, PUs and TUs) for the coding purpose. As known in the field, the image may be divided into smaller images areas, such as slices, tiles, CTU rows or CTUs before applying the block partition. The process to partition an image into blocks for the coding purpose is referred as partitioning the image using a coding unit (CU) structure. The particular partition method to generate CUs, PUs and TUs as adopted by HEVC is an example of the coding unit (CU) structure. The QTBT tree structure is another example of the coding unit (CU) structure.

To further support more partition shapes to achieve more flexible partitioning, triple tree partitioning method is designed to capture objects which locate in the block center while quad-tree and binary tree partitioning methods always split along the block center. FIG. 6 illustrates vertical triple tree partitioning (610) and horizontal triple tree partitioning (620). The triple tree partitioning method may provide capability to faster localize small object along block boundaries, by allowing one-quarter partitioning vertically or horizontally.

Multi-Type-Tree (MTT) block partitioning extends the concept of the two-level tree structure in QTBT by allowing both the binary tree and triple tree (or also called as ternary tree) partitioning methods in the second level of MTT. The two levels of trees in MTT are called region tree (RT) and prediction tree (PT) respectively. The first level RT is always quad-tree (QT) partitioning, and the second level PT may be either binary tree (BT) partitioning or triple tree (TT) partitioning. For example, a CTU is firstly partitioned by RT, which is QT partitioning, and each RT leaf node may be further split by PT, which is either BT or TT partitioning. A block partitioned by PT may be further split with PT until a maximum PT depth is reached. For example, a block may be first partitioned by vertical BT partitioning to generate a left sub-block and a right sub-block, and the left sub-block is further split by horizontal TT partitioning while the right sub-block is further split by horizontal BT partitioning. A PT leaf node is the basic Coding Unit (CU) for prediction and transform and will not be further split.

FIG. 7 illustrates an example of tree-type signalling in MTT. As shown in FIG. 7, whether a block is split for RT is checked at node 710. A "1" is signalled to indicate the RT split is applied to the current block as indicated by node 720. A "0" is signalled to indicate the RT split is not applied to the current block. In this case, whether BT or TT is applied to the current block is checked as indicated by node 730. If neither BT nor TT is applied to the current block (i.e., the "0" branch), the partition process reaches a leaf node (i.e., no partition) as indicated by node 740. If BT or TT is applied to the block (i.e., the "1" branch), the system will further signal to indicate whether it is a horizontal split or vertical split as indicated by node 750. A "0" is signalled to indicate the BT/TT split is horizontal as indicated by node 760. A "1" is signalled to indicate the BT/TT split is vertical as indicated by node 770. In this case, an additional bit is signalled to indicate whether it is BT as indicated by node 780 (i.e., the "0" branch) or TT as indicated by node 790 (i.e., the "1" branch). Similar signalling is also applied to the case of horizontal BT/TT at node 760.

After constructing the MTT block partition, MTT leaf nodes are CUs, which are used for prediction and transform without any further partitioning. In MTT, the proposed tree structure is coded separately for luma and chroma in I slice, and applied simultaneously to both luma and chroma (except when certain minimum sizes are reached for chroma) in P and B slice. That is to say that, in I slice, the luma CTB has its QTBT-structured block partitioning, and the two chroma CTBs has another QTBT-structured block partitioning.

While the MTT is able to improve performance by adaptively partitioning blocks for prediction and transform, it is desirable to further improve the performance whenever possible in order to achieve an overall efficiency target.

Merge Mode

To increase the coding efficiency of motion vector (MV) coding in HEVC, HEVC has the Skip and Merge modes. Skip and Merge modes obtain the motion information from spatially neighbouring blocks (spatial candidates) or a temporal co-located block (temporal candidate). When a PU is Skip or Merge mode, no motion information is coded. Instead, only the index of the selected candidate is coded. For Skip mode, the residual signal is forced to be zero and not coded. In HEVC, if a particular block is encoded as Skip or Merge, a candidate index is signalled to indicate which candidate among the candidate set is used for merging. Each merged PU reuses the MV, prediction direction, and reference picture index of the selected candidate.

For Merge mode in HEVC reference software HM-4.0, as shown in FIG. 8, up to four spatial MV candidates are derived from $A_0$, $A_1$, $B_0$ and $B_1$, and one temporal MV candidate is derived from $T_{BR}$ or $T_{CTR}$ ($T_{BR}$ is used first, if $T_{BR}$ is not available, $T_{CTR}$ is used instead). Note that if any of the four spatial MV candidates is not available, the position B2 is then used to derive MV candidate as a replacement. After the derivation process of the four spatial MV candidates and one temporal MV candidate, removing redundancy (pruning) is applied to remove redundant MV candidates. If after removing redundancy (pruning), the number of available MV candidates is smaller than five, three types of additional candidates are derived and are added to the candidate set (i.e., candidate list). The encoder selects one final candidate within the candidate set for Skip, or Merge modes based on the rate-distortion optimization (RDO) decision, and transmits the index to the decoder.

Hereafter, both Skip and Merge modes may be referred as "Merge mode" for convenience. In other words, the "Merge mode" in this disclosure hereafter may mean both Skip and Merge mode.

Merge Mode and AMVP Mode

To achieve the best coding efficiency of hybrid coding architecture in HEVC, there are two kinds of prediction modes (i.e., Intra prediction and Inter prediction) for each PUInter. For Intra prediction modes, the spatial neighbouring reconstructed pixels can be used to generate the directional predictions. There are up to 35 directions in HEVC. For Inter prediction modes, the temporal reconstructed reference frames can be used to generate motion compensated predictions. There are three different modes, including Skip, Merge and Inter Advanced Motion Vector Prediction (AMVP) modes.

When a PU is coded in Inter AMVP mode, motion-compensated prediction is performed with transmitted motion vector differences (MVDs) that can be used together with Motion Vector Predictors (MVPs) for deriving motion vectors (MVs). To decide MVP in Inter AMVP mode, the advanced motion vector prediction (AMVP) scheme is used to select a motion vector predictor among an AMVP candidate set including two spatial MVPs and one temporal MVP. So, in AMVP mode, MVP index for MVP and the corresponding MVDs are required to be encoded and transmitted. In addition, the Inter prediction direction to specify the prediction directions among bi-prediction, and uni-prediction which are list 0 (i.e., L0) and list 1 (i.e., L1), accompanied with the reference frame index for each list should also be encoded and transmitted.

When a PU is coded in either Skip or Merge mode, no motion information is transmitted except for the Merge index of the selected candidate since the Skip and Merge modes utilize motion inference methods. Since the motion vector difference (MVD) is zero for the Skip and Merge modes, the MV for the Skip or Merge coded block is the same as the motion vector predictor (MVP) (i.e., MV=MVP+MVD=MVP). Accordingly, the Skip or Merge coded block obtains the motion information from spatially neighbouring blocks (spatial candidates) or a temporal block (temporal candidate) located in a co-located picture. The co-located picture is the first reference picture in list 0 or list 1, which is signalled in the slice header. In the case of a Skip PU, the residual signal is also omitted. To decide the Merge index for the Skip and Merge modes, the Merge scheme is used to select a motion vector predictor among a Merge candidate set containing four spatial MVPs and one temporal MVP.

FIG. 8 shows the neighbouring PUs used to derive the spatial and temporal MVPs for both AMVP and Merge scheme. In AMVP, the left MVP is the first available one from $A_0$, $A_1$, the top MVP is the first available one from $B_0$, $B_1$, $B_2$, and the temporal MVP is the first available one from $T_{BR}$ or $T_{CTR}$ ($T_{BR}$ is used first, if $T_{BR}$ is not available, $T_{CTR}$ is used instead). If the left MVP is not available and the top MVP is not scaled MVP, the second top MVP can be derived if there is a scaled MVP among $B_0$, $B_1$, and $B_2$. The list size of MVPs of AMVP is 2 in HEVC. Therefore, after the derivation process of the two spatial MVPs and one temporal MVP, only the first two MVPs can be included in the MVP list. If after removing redundancy, the number of available MVPs is less than two, zero vector candidates are added to the candidates list.

For Skip and Merge mode, as shown in FIG. 8, up to four spatial Merge index are derived from $A_0$, $A_1$, $B_0$ and $B_1$, and one temporal Merge index is derived from $T_{BR}$ or $T_{CTR}$ ($T_{BR}$ is used first, if $T_{BR}$ is not available, $T_{CTR}$ is used instead). Note that if any of the four spatial Merge index is not available, the position $B_2$ is then used to derive Merge index as a replacement. After the derivation process of the four spatial Merge index and one temporal Merge index, removing redundancy is applied to remove redundant Merge index. If after removing redundancy, the number of available Merge index is smaller than five, three types of additional candidates are derived and are added to the candidates list.

Additional bi-predictive Merge candidates are created by using original Merge candidates. The additional candidates are divided into three candidate types:

1. Combined bi-predictive Merge candidate (candidate type 1)
2. Scaled bi-predictive Merge candidate (candidate type 2)
3. Zero vector Merge/AMVP candidate (candidate type 3)

In candidate type 1, combined bi-predictive Merge candidates are created by combining original Merge candidate. In particular, two candidates in original candidates, which have mvL0 (the motion vector in list 0) and refIdxL0 (the reference picture index in list 0) or mvL1 (the motion vector in list 1) and refIdxL1 (the reference picture index in list 1), are used to created bi-predictive Merge candidates. FIG. 9 illustrates an example of the derivation process for combined bi-predictive Merge candidate. The candidate set 910 corresponds to an original candidate list, which includes mvL0_A, ref0 (931) in L0 and mvL1_B, ref (932) in L1. A bi-prediction MVP 933 can be formed by combining the candidates in L0 and L1.

In candidate type 2, scaled bi-predictive Merge candidates are created by scaling original Merge candidate. In particular, one candidate in original candidates, which have mvLX (the motion vector in list X) and refIdxLX (the reference picture index in list X), X can be 0 or 1, is used to created bi-predictive Merge candidates. For example, one candidate A is list 0 uni-predictive with mvL0_A and ref0, ref0 is firstly copied to reference index ref0' in list 1. After that, mvL0' _A is calculated by scaling mvL0_A with ref0 and ref0'. Then, bi-predictive Merge candidate which has mvL0_A and ref0 in list 0 and mvL0'_A and ref0' in list 1, is created and added into Merge candidate list. An example of the derivation process of the scaled bi-predictive Merge candidate is shown in FIG. 10, where candidate list 1010 corresponds to an original candidate list and candidate list 1020 corresponds to the expanded candidate list including two generated bi-prediction MVPs.

In candidate type 3, Zero vector Merge/AMVP candidates are created by combining zero vectors and reference index which can be referred. FIG. 11A illustrates an example for adding zero vector Merge candidates, where candidate list 1110 corresponds to an original Merge candidate list and candidate list 1120 corresponds to the extended Merge candidate list by adding zero candidates. FIG. 11B illustrates an example for adding zero vector AMVP candidates, where candidate lists 1130 (L0) and 1132 (L1) correspond to original AMVP candidate lists and the candidate list 1140 (L0) and 1142 (L1) correspond to the extended AMVP candidate lists by adding zero candidates. If zero vector candidates are not duplicated, it is added to Merge/AMVP candidates list.

PMVD Mode or FRUC Mode

The PMVD (Pattern-based Motion Vector Derivation) mode (or named as PMMVD (Pattern Matched Motion Vector Derivation) or FRUC (Frame-Rate Up-Conversion) mode) is a coding tool disclosed in JVET Test Model 3 (Joint Video Exploration Team (JVET) of ITU-T SG 16 WP 3 and ISO/IEC JTC 1/SC 29/WG 11: 3rd Meeting: Geneva, CH, 26 May-1 Jun. 2016, Document Title: *Algorithm Description of Point Exploration Test Model* 3), which can use an L-shape template or bi-lateral template to refine the MV of Merge mode and save the bits of MVD.

BRIEF SUMMARY OF THE INVENTION

A method and apparatus of video coding for a video encoding system or video decoding system are disclosed. According to this method, the current block is partitioned into multiple final sub-blocks using one or more stages of sub-tree partition comprising ternary tree partition and at least one other-type partition, where ternary tree partition is excluded from the sub-tree partition if a current sub-tree depth associated with a current sub-block is greater than a first threshold and the first threshold is an integer greater than or equal to 1.

Said at least one other-type partition comprises quadtree partition, binary-tree partition or both. The current block may correspond to one Coding Tree Unit (CTB) and each of the multiple final sub-blocks corresponds to one Coding Unit (CU), Prediction Unit (PU) or Transform Unit (TU). The first threshold can be pre-determined or is inferred at the decoder side.

An indicator for indicating whether the ternary tree partition is selected for the current sub-block can be omitted if the current sub-tree depth associated with the current sub-block is greater than the first threshold.

The first threshold may correspond to a maximum allowed sub-tree partitioning depth minus a second threshold, where the second threshold is an integer smaller than the maximum allowed sub-tree partitioning depth and greater than or equal to 0. The value of the second threshold may be dependent on whether the current image is in an Intra slice or an Inter slice. The value of the second threshold can be signalled in a video parameter set (VPS), a sequence parameter set (SPS), a picture parameter set (PPS), a slice header, a coding unit, or a combination thereof.

A method and apparatus of video coding using an Inter mode are disclosed. If a test condition is satisfied, the current block is encoded at an encoder side or decoded at a decoder side using a current Inter mode selected from a modified group of Inter tools, where the modified group of Inter tools is derived from an initial group of Inter tools by removing one or more first Inter tools from the initial group of Inter tools, replacing one or more second Inter tools with one or more complexity-reduced Inter tools, or both.

Said one or more first Inter tools can be selected from a set comprising AMVP (Advanced Motion Vector Prediction), Merge, PMVD (Pattern Matched Motion Vector Derivation), LIC, Affine coding, NPO, OBMC (Overlap Block Motion Compensation) or a combination thereof.

Whether the test condition is satisfied may depend on a coding-tree depth associated with the current block. Whether the test condition is satisfied may depend on a block size of the current block. Whether the test condition is satisfied may also depend on a coding-tree depth associated with the current block and a block size of the current block.

In one embodiment, the test condition is satisfied if a coding-tree depth associated with the current block is equal to a pre-defined value and a block size of the current block is greater than or equal to a threshold.

In one embodiment, when a target first Inter tool is removed from the initial group of Inter tools, a syntax element associated with the target first Inter tool is not signalled at an encoder side or is not parsed at a decoder side for the current block. In another embodiment, when said one or more first Inter tools are removed from the initial group of Inter tools, the current block uses a candidate list with reduced number of candidates in the candidate list by excluding said one or more first Inter tools from the candidate list.

Another method and apparatus of video coding using an Inter mode are disclosed. If a test condition is satisfied, the current block is partitioned into multiple final sub-blocks using restricted coding-tree structure comprising one or more stages of multi-type partitions, wherein the restricted-coding tree structure terminates coding-tree partition for a target sub-block having a coding-tree partition depth equal to a threshold.

Whether the test condition is satisfied may depend on a block size of the current block. Whether the test condition is satisfied may depend on a temporal layer of current slice, where the current slice includes the current block. The temporal layer is referring to the layer associated with the temporal structure of pictures (e.g. I, B and P pictures). Whether the test condition is satisfied may depend on a best predicted mode of the current block. Whether the test condition is satisfied may depend on a ratio of width and height of the current block. Whether the test condition is satisfied may depend on a partition decision for a predecessor sub-block of the target sub-block at a second coding-tree partition depth smaller than the threshold. Whether the test condition is satisfied may also depend on a quantization parameter of current slice, wherein the current slice includes the current block.

A syntax element for indicating a partition decision of the target sub-block if the coding-tree partition depth is equal to the threshold.

BRIEF DESCRIPTION OF THE DRAWINGS

FIG. 3 illustrates an example of various binary splitting types used by a binary tree partitioning structure, where a block can be recursively split into two smaller blocks using the splitting types.

FIG. 4 illustrates an example of block partitioning and its corresponding binary tree, where in each splitting node (i.e., non-leaf node) of the binary tree, one syntax is used to indicate which splitting type (horizontal or vertical) is used, where 0 may indicate horizontal splitting and 1 may indicate vertical splitting.

FIG. 17 illustrates an example of adaptive block partition according to an embodiment of the present invention, where the current CU is marked by the slant-line filled area, and the eight 4×4 neighbouring sub-CUs are marked by areas filled with dots.

FIG. 18A to FIG. 18E illustrate an example of split cost evaluation associated with a current partition type based on accumulated cost of the coat of previous coded blocks and the cost of currently coded sub-block, where FIG. 18A shows a CTU that is still under the encoding process and FIG. 18B through FIG. 18E show the accumulated cost calculations at depths 3, 2, 1 and 0 respectively.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

In the video coding based on the Multi-Type-Tree (MTT) Block Partition structure, the coding efficiency has been shown noticeable improvement since more flexible partitions become available. However, the MTT block partition increases computational complexity. It is desirable to develop methods to reduce computational complexity when MTT is used. Accordingly, various methods to reduce the computational complexity associated with MTT are disclosed.

Multi-Type-Tree (MTT) Block Partition Constraints

In order to reduce signalling overhead and improve the performance of Multi-Type-Tree (MTT) partitioning method, the constrained block partitioning methods are proposed to avoid redundancy or to reduce complexity. The proposed constrained block partitioning methods involve modified encoding or decoding processing by prohibiting a certain partition type and partition direction for splitting a current sub-block according to the partition type or partition direction of a previous partitioning.

MTT Block Partition Constraints—Method 1

Figure 1:
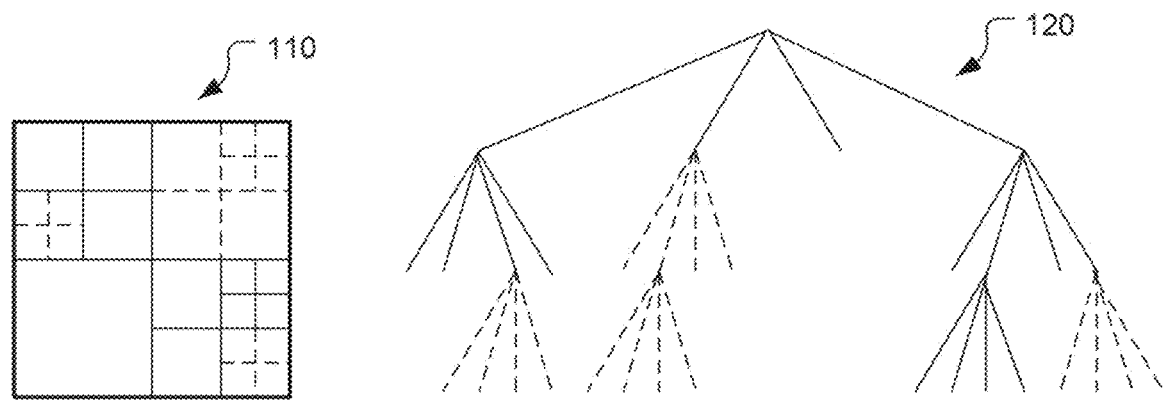
FIG. 1 illustrates an example of block partition using quadtree structure to partition a coding tree unit (CTU) into coding units (CUs).
Figure 2:
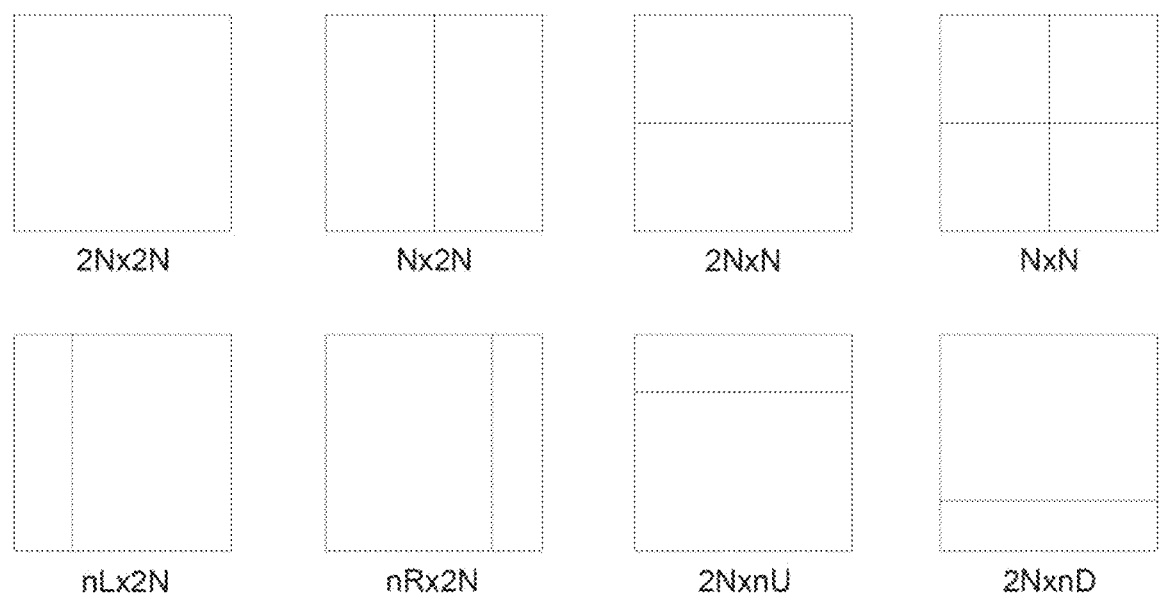
FIG. 2 illustrates asymmetric motion partition (AMP) according to High Efficiency Video Coding (HEVC), where the AMP defines eight shapes for splitting a CU into PU.
Figure 5:
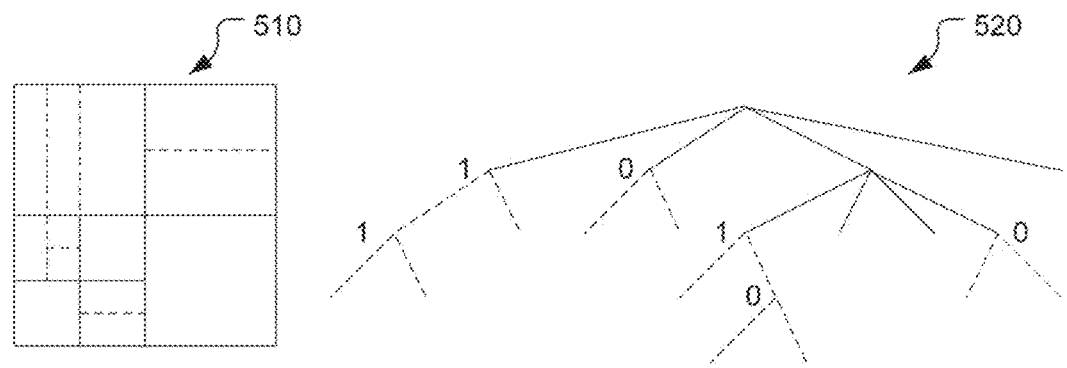
FIG. 5 illustrates an example of block partitioning and its corresponding quad-tree plus binary tree structure (QTBT), where the solid lines indicate quadtree splitting and dotted lines indicate binary tree splitting.
Figure 6:
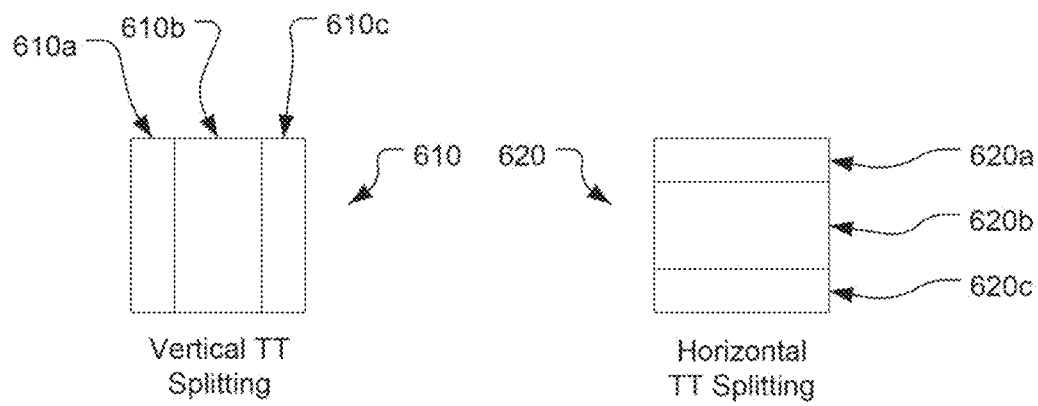
FIG. 6 illustrates vertical triple tree partitioning and horizontal triple tree partitioning.
Figure 7:
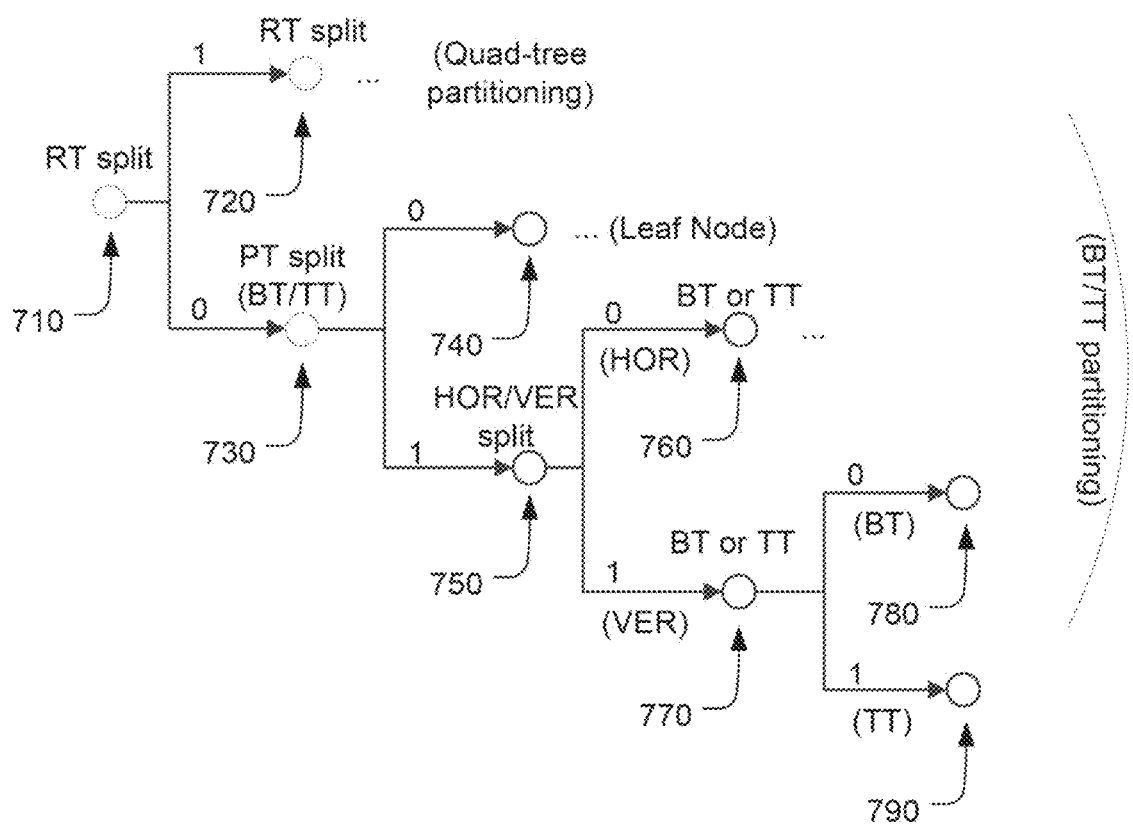
FIG. 7 illustrates an example of tree-type signalling in Multi-Type-Tree (MTT) block partitioning.
Figure 8:
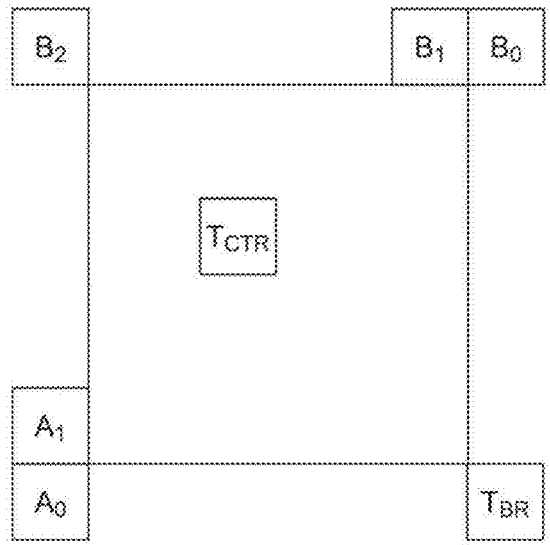
FIG. 8 shows the neighbouring PUs used to derive the spatial and temporal MVPs for both AMVP and Merge scheme.
Figure 9:
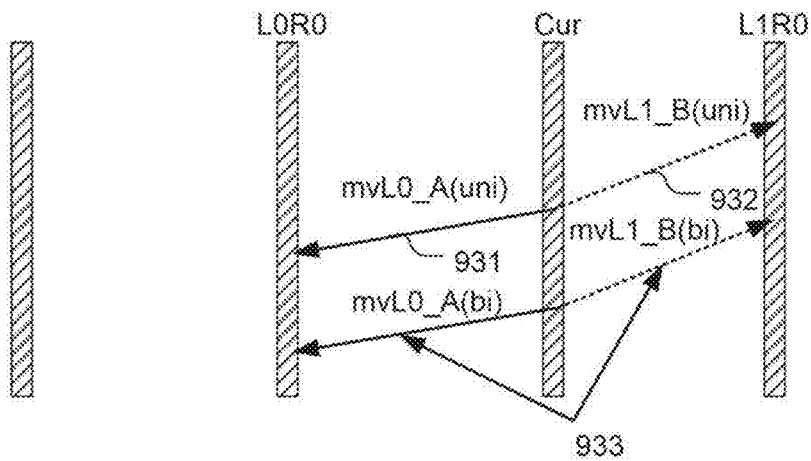
FIG. 9 illustrates an example of the derivation process for combined bi-predictive Merge candidate.
Figures 10, 11A:
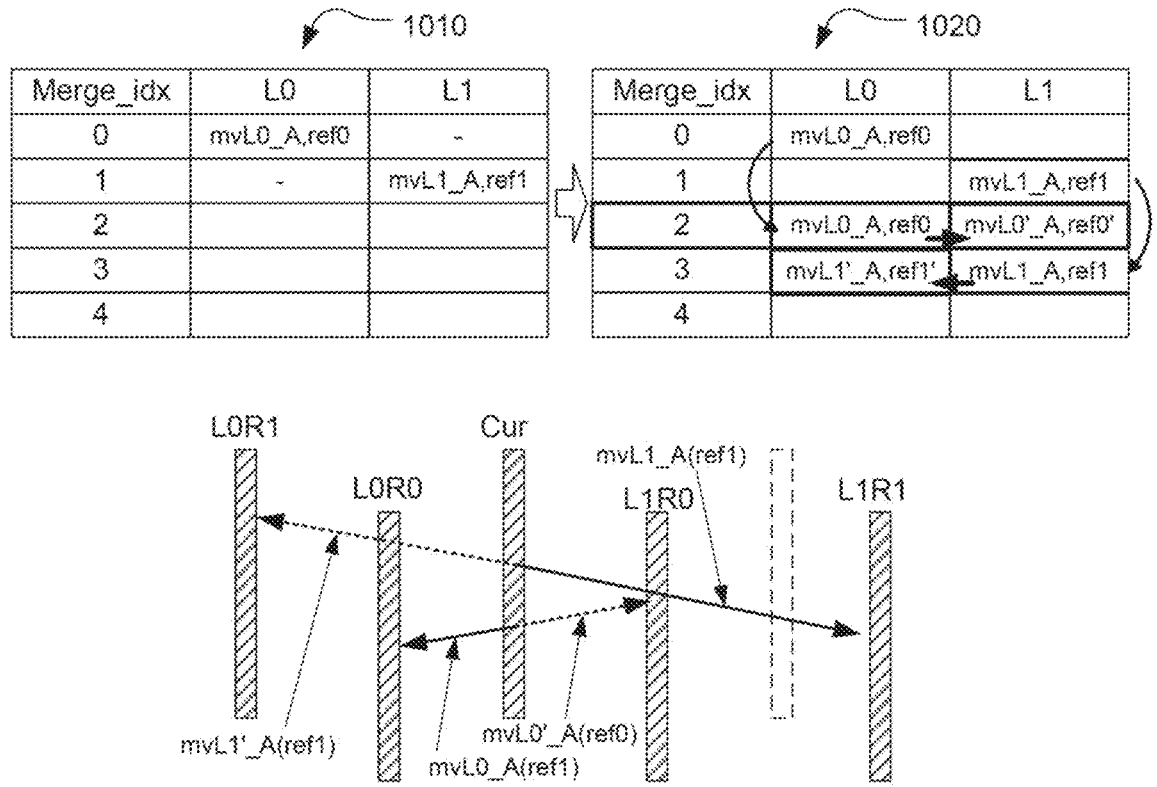
FIG. 10 illustrates an example of the derivation process of the scaled bi-predictive Merge candidate, where candidate list on the left corresponds to an original candidate list and the candidate list on the right corresponds to the expanded candidate list including two generated bi-prediction MVPs.
FIG. 11A illustrates an example of adding zero vector Merge candidates, where the candidate list on the left corresponds to an original Merge candidate list and the candidate list on the right corresponds to the extended Merge candidate list by adding zero candidates.
Figures 11B, 12:
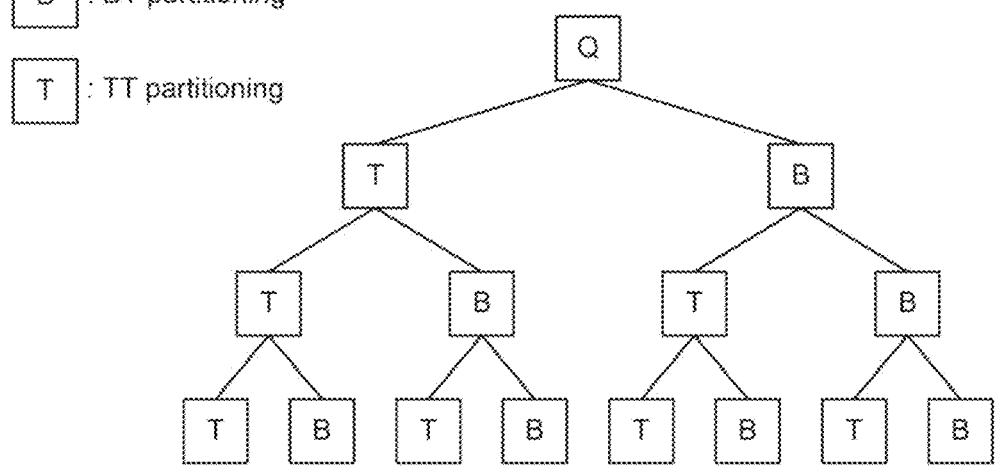
FIG. 11B illustrates an example for adding zero vector AMVP candidates, where the candidate lists on the top correspond to original AMVP candidate lists (L0 on the left and L1 on the right) and the candidate lists at the bottom correspond to the extended AMVP candidate lists (L0 on the left and L1 on the right) by adding zero candidates.
FIG. 12 illustrates one example of the hierarchical splitting decision tree of MTT with the maximal PT depth equal to 3.
Figure 13:
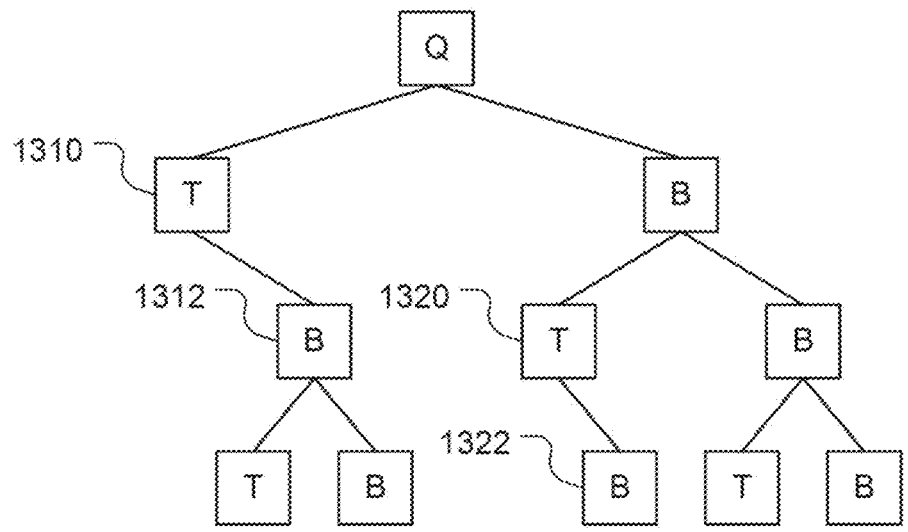
FIG. 13 illustrates one example of the hierarchical splitting decision tree of MTT with the proposed prohibited partitioning based on the hierarchical splitting decision tree of MTT shown in FIG. 12.

In one embodiment, if the current partitioning is TT (Ternary Tree) partitioning, only BT (Binary Tree) partitioning is allowed for splitting the sub-blocks (i.e., the first sub-block, the middle sub-block or the third sub-block) resulted from the TT partitioning. Take FIG. 6 for example, the first sub-block 610a, the middle sub-block 610b and the third sub-block 610c are taken as the sub-blocks resulted from the Vertical TT partitioning 610 respectively, and the first sub-block 620a, the middle sub-block 620b and the third sub-block 620c are taken as the sub-blocks resulted from the Horizontal TT partitioning 620 respectively. FIG. 12 shows the example of the hierarchical splitting decision tree of MTT with the maximal PT (Prediction Tree) depth equal to 3. FIG. 13 shows one example of the hierarchical splitting decision tree of MTT with the proposed prohibited partitioning based on the hierarchical splitting decision tree of MTT shown in FIG. 12. As shown in FIG. 13, when the current partitioning is TT 1310, only BT 1312 is allowed (i.e., TT is prohibited or excluded for 1312). When the current partitioning is TT 1320, only BT 1322 is allowed (i.e., TT is prohibited or excluded for 1322).

In another embodiment, if the current partitioning is TT partitioning, and only BT partitioning is allowed for splitting the first sub-block, the middle sub-block or the third sub-block resulted from the TT partitioning, the split types (BT or TT partitioning) of the first sub-block, the middle sub-block, or the third sub-block resulted from the TT partitioning may not be signalled and may be inferred to be BT partitioning.

MTT Block Partition Constraints—Method 2

Figure 14:
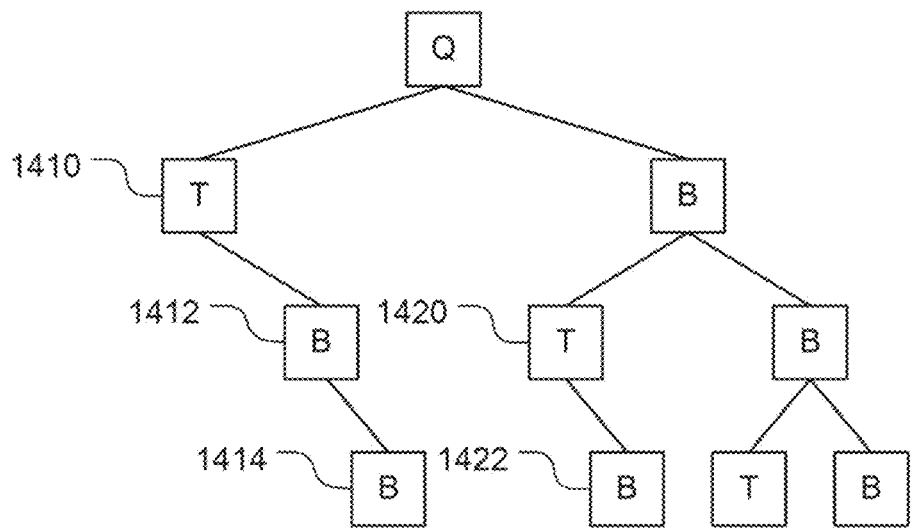
FIG. 14 illustrates one example of the hierarchical splitting decision tree of MTT with the proposed prohibited partitioning based on the hierarchical splitting decision tree of MTT shown in FIG. 12.

In one embodiment, if the current partitioning is split by TT partitioning, only BT partitioning is allowed for splitting all of the sub-blocks within the first sub-block, the middle sub-block, or the third sub-block resulted from the TT partitioning. FIG. 14 shows the hierarchical splitting decision tree of MTT with the proposed prohibited partitioning based on the hierarchical splitting decision tree of MTT shown in FIG. 12. As shown in FIG. 14, when the current partitioning is TT 1410, only BT 1412 is allowed (i.e., TT is prohibited or excluded for 1412). For this BT 1412, only BT 1414 is allowed (i.e., TT is prohibited or excluded for 1414) since the BT 1412 is the sub-block of the TT 1410 and the BT 1414 is the sub-block of such kind of BT 1412. In other words, only BT partitioning is allowed for splitting all of the sub-blocks 1412 and 1414 within the sub-block 1412 resulted from the TT partitioning 1410. When the current partitioning is TT 1420, only BT 1422 is allowed (i.e., TT is prohibited or excluded for 1422).

In another embodiment, if the current partitioning is TT partitioning, and only BT partitioning is allowed for splitting all of the sub-blocks within the first sub-block, the middle sub-block, or the third sub-block resulted from the TT partitioning, the split types (BT or TT partitioning) for all of the sub-blocks within the first sub-block, the middle sub-block, or the third sub-block resulted from the TT partitioning may not be signalled and may be inferred to be BT partitioning.

MTT Block Partition Constraints—Method 3

Figure 15:
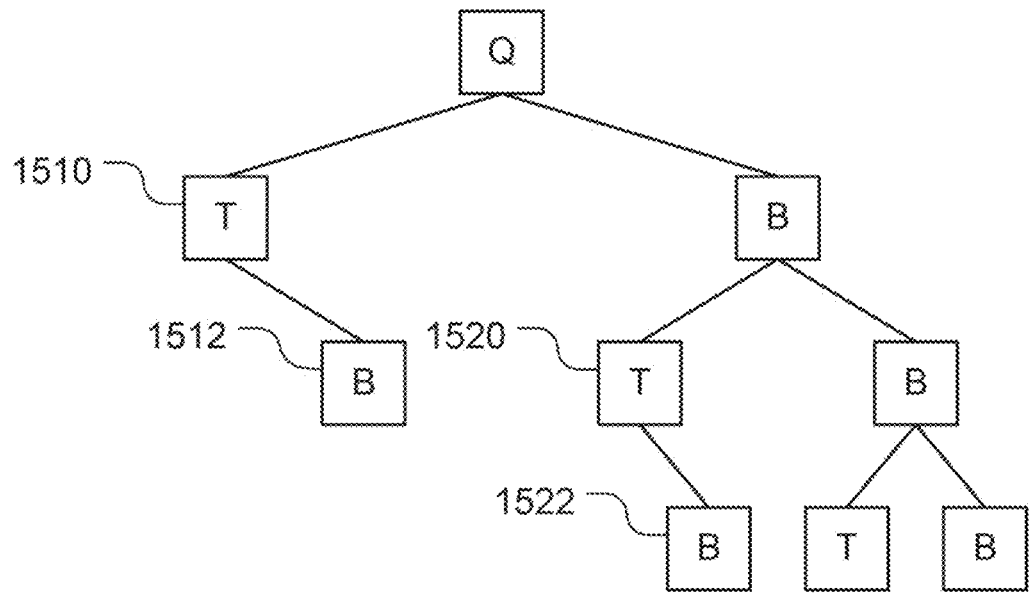
FIG. 15 illustrates one example of the hierarchical splitting decision tree of MTT with the prohibited partitioning based on the hierarchical splitting decision tree of MTT shown in FIG. 12.

In one embodiment, if the current partitioning is TT partitioning, only one-layer BT partitioning is allowed for splitting the first sub-block, the middle sub-block, or the third sub-block resulted from the TT partitioning. FIG. 15 shows the hierarchical splitting decision tree of MTT with the prohibited partitioning based on the hierarchical splitting decision tree of MTT shown in FIG. 12. As shown in FIG. 15, when the current partitioning is TT 1510, only one layer BT 1512 is allowed (i.e., only one-layer partitioning 1512, partitioning of which is only allowed to be BT but not TT). When the current partitioning is TT 1520, only one layer BT 1522 is allowed.

In another embodiment, if the current partitioning is TT partitioning and only one-layer BT partitioning is allowed for splitting the first sub-block, the middle sub-block, or the third sub-block resulted from the TT partitioning, the split types (BT or TT partitioning) of the first sub-block, the middle sub-block, or the third sub-block resulted from the TT partitioning may not be signalled and may be inferred to be BT partitioning. Besides, the split decisions (split or non-split) of the first sub-block or the second-block resulted from the BT partitioning may not be signalled and may be inferred to be the non-split case.

MTT Block Partition Constraints—Method 4

The prohibited partition type and partition direction for splitting a current sub-block can depend on not only the partition type and partition direction of a previous partition level but also the partition type, partition direction and a position of the current sub-block.

In one embodiment, if the first sub-block split from the parent block by BT partitioning is further split by a first partition type same as the parent partition type and a first partition direction same as the parent partition direction, the second sub-block split type and the second sub-block split direction for splitting the second sub-block are determined by prohibiting splitting the second sub-block by the first partition type and the first partition direction of the first sub-block.

Figure 16A:
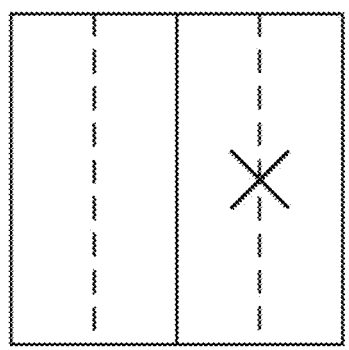
FIG. 16A illustrates an example of prohibited partitioning, where the solid line indicates vertical BT partitioning at a previous partition level (e.g. level i) and the dash line indicates vertical BT partitioning for the first sub-blocks at a current partition level (e.g. level i+1).
Figure 16B:
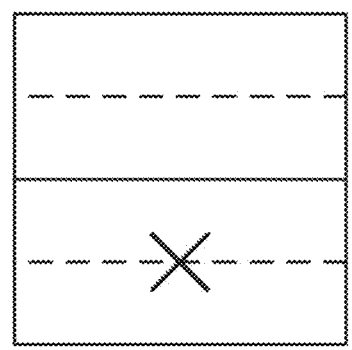
FIG. 16B illustrates an example of prohibited partitioning, where the solid line indicates horizontal BT partitioning at a previous partition level (e.g. level i) and the dash line indicates horizontal BT partitioning for the first sub-blocks at a current partition level (e.g. level i+1).

FIG. 16A illustrates an example of the prohibited partitioning. The solid line in FIG. 16A indicates vertical BT partitioning at a previous partition level (e.g. level i) and the dash line indicates vertical BT partitioning for the first sub-blocks at a current partition level (e.g. level i+1). The dash-dotted line indicates vertical BT partitioning for the second sub-blocks at a current partition level (e.g. level i+1) that is prohibited for splitting the second sub-block. BT partitioning is prohibited to further split the second sub-block resulted from BT partitioning in the parent block because the resulting sub-blocks will be exactly the same as applying vertical TT partitioning at the previous partition level first and then apply vertical BT partitioning for the middle sub-block resulting from the TT partitioning at the current partition level. Similarly, horizontal BT partitioning is disabled for further splitting a second sub-block split by horizontal BT partitioning as shown in FIG. 16B. The solid line in FIG. 16B indicates horizontal BT partitioning at a previous partition level (e.g. level i) and the dash line indicates horizontal BT partitioning for the first sub-block at a current partition level (e.g. level i+1).). The dash-dotted line indicates horizontal BT partitioning for the second sub-blocks at a current partition level (e.g. level i+1) that is prohibited for splitting the second sub-block.

In one embodiment, in cases when the syntax of the current partition direction is signalled before the syntax of the current partition type, the second sub-block split type may not be signalled and may be inferred to be TT partitioning if the second sub-block partition direction is horizontal partitioning. The parent block is split by horizontal BT partitioning and the first sub-block is further split by horizontal BT partitioning. Similarly, the second sub-block partition type may not be signalled and may be inferred to be TT partitioning if the current partition direction is vertical partitioning, the parent block is split by vertical BT partitioning and the first sub-block is further split by vertical BT partitioning.

In another embodiment, in cases when the syntax of the current partition type is signalled before the syntax of the current partition direction, the second sub-block split direction may not be signalled and may be inferred to be vertical if the second sub-block partition type is BT partitioning, the parent block is split by horizontal BT partitioning and the first sub-block is further split by horizontal BT partitioning. Similarly, the second sub-block partition direction may not be signalled and may be inferred to be horizontal partitioning if the second sub-block partition type is BT partitioning, the parent block is split by vertical BT partitioning and the first sub-block is further split by vertical BT partitioning.

MTT Block Partition Constraints—Method 5

During the sub-tree partition, the ternary-tree partition is allowed for splitting the current block when the current sub-tree depth is equal to or smaller than the maximum allowed sub-tree partitioning depth minus a threshold N. Moreover, the threshold N is predetermined and can be inferred at the decoder side. The indicator for selecting the ternary-tree partition type is absent when the current sub-tree partition depth is larger than the maximum allowed sub-tree partitioning depth minus a threshold N.

For example, the current sub-tree partition depth is S and the maximum allowed sub-tree partition depth is M then the ternary-tree partition is allowed for splitting the current block when $S \leq (M-N)$, where $M > N \geq 0$. Besides, if the current sub-tree partition depth is larger than (M−N), then the indicator for selecting ternary-tree partition is absent.

MTT Block Partition Constraints—Method 6

During the sub-tree partition, the ternary-tree partition is allowed for splitting the current block when the current sub-tree depth is equal to or smaller than the maximum allowed sub-tree partitioning depth minus a threshold N. Moreover, the setting of the threshold N could be varied according to the slice type, colour component of the current slice, or the temporal layer ID of the current slice or any other test condition (for example, such variation can be achieved by determining the setting of the threshold N according to the slice type, colour component of the current slice, or the temporal layer ID of the current slice). Besides, all threshold values are predetermined and inferred at decoder side, and the indicator for selecting the ternary-tree partition type is absent when the current sub-tree partition depth is larger than the maximum allowed sub-tree partitioning depth minus the corresponding threshold N.

In another example, the threshold is $N_1$ for an Intra-slice and $N_2$ for an Inter-slice. Then, assume that the current sub-tree partition depth is S, and the maximum allowed sub-tree partition depth is M. If the current slice is Intra-slice, then the ternary-tree partition is allowed for splitting the current block when $S \leq (M-N_1)$, and the indicator for selecting ternary-tree partition is omitted or absent (for example, being omitted or absent by not signaling or not parsing such indicator) once $S > (M-N_1)$. Similarly, if the current slice is inter-slice, then the ternary-tree partition is allowed for splitting the current block when $S \leq (M-N_2)$, and the indicator for selecting ternary-tree partition is omitted or absent (for example, being omitted or absent by not signaling or not parsing such indicator) once $S > (M-N_2)$.

MTT Block Partition Constraints—Method 7

During the sub-tree partition, the ternary-tree partition is allowed for splitting the current block when the current sub-tree depth is equal to or smaller than the maximum allowed sub-tree partitioning depth minus a threshold N, and N>0. The threshold N can be signalled in a video parameter set (VPS), a sequence parameter set (SPS), a picture parameter set (PPS), a slice header, a coding unit, or any combination thereof. For example, 0 is signalled in SPS to represent N is 1; 1 is signalled in SPS to represent N is 2; and so on. Moreover, the indicator for selecting the ternary-tree partition type can be omitted or absent (for example, being omitted or absent by not signaling or not parsing such indicator) when the current sub-tree partition depth is larger than the maximum allowed sub-tree partitioning depth minus a threshold N.

In yet another example, the current sub-tree partition depth is S and the maximum allowed sub-tree partition depth is M, then the ternary-tree partition is allowed for splitting the current block when $S \leq (M-N)$, where $M > N > 0$. Besides, if the current sub-tree partition depth is larger than (M−N), then the indicator for selecting ternary-tree partition can be omitted or absent (for example, being omitted or absent by not signaling or not parsing such indicator).

MTT Block Partition Constraints–Method 8

During the sub-tree partition, the ternary-tree partition is allowed for splitting the current block when the current sub-tree depth is equal to or smaller than the maximum allowed ternary-tree partitioning depth (MaxTTDepth). MaxTTDepth only can be equal to or smaller than sub-tree partitioning depth. Besides, MaxTTDepth can be signalled in a video parameter set (VPS), a sequence parameter set (SPS), a picture parameter set (PPS), a slice header, a coding unit, or any combination thereof. Moreover, the indicator for selecting the ternary-tree partition type can be omitted or absent (for example, being omitted or absent by not signaling or not parsing such indicator) when the current sub-tree partition depth is larger than MaxTTDepth.

In yet another example, the current sub-tree partition depth is S, the maximum allowed sub-tree partition depth is M, and MaxTTDepth is N. Then, the ternary-tree partition is allowed for splitting the current block when $S \leq M$, where $M \leq N$. Besides, if the current sub-tree partition depth is larger than M, then the indicator for selecting ternary-tree partition can be omitted or absent (for example, being omitted or absent by not signaling or not parsing such indicator).

Any of the foregoing proposed methods can be implemented in encoders and/or decoders. For example, any of the proposed methods can be implemented in an Inter/Intra/prediction/transform module of an encoder, and/or an inverse transform/Inter/Intra/prediction module of a decoder. Alternatively, any of the proposed methods can be implemented as a circuit coupled to the inverse transform/Inter/Intra/prediction module of the encoder and/or the Inter/Intra/prediction/transform module of the decoder, so as to provide the information needed by the Inter/Intra/prediction/transform module.

Complexity Reduction Associated with Inter Mode

In this disclosure, the QT Depth is defined as the depth of Quad Tree. The BT Depth is defined as the splitting depth of binary tree (BT). The TT Depth is defined as the splitting depth of ternary tree or triple tree (TT).

The CT depth is defined as the depth of splitting of binary tree (BT) or triple tree (TT). It is the total number of binary tree (BT) or triple tree (TT) splitting. In other words, if the total number of BT splitting is 3, the coding-tree structure is split 3 times by the BT. The CT depth can also be the number of binary tree (BT) splitting only. The CT depth can be the number of triple tree (TT) only splitting. The larger the maximum CT depth in video encoder, the larger the encoding complexity overhead. Therefore, it is desirable to reduce the computation complexity.

Method 1: Skip Some Inter Modes

The Inter mode includes AMVP, Merge mode, FRUC mode, or other inter-prediction modes or tools. There are many Inter coding tools, such as AMVP, Merge, FRUC/PMVD, LIC (local illumination compensation), Affine coding, NPO (Neighboring-derived Prediction Offset), OBMC (Overlap Block Motion Compensation), and so on. And an initial group of Inter tools can be determined from these Inter coding tools.

In the proposed method, one or more Inter modes (or tools) or a portion of certain Inter modes on an encoder side (or on both the encoder and decoder sides) can be skipped or eliminated if a certain condition (or called a test condition) is satisfied. Here "a portion of a certain Inter mode" means a simplified version of a certain Inter mode on the encoder side. For example, a partial procedure of Merge mode can be skipped in the encoder if a certain condition is satisfied. In this example, instead of checking MAX candidates (MAX being the maximum number of Merge candidates) in the conventional RDO process, the simplified Merge mode can have only 3 candidates (Merge candidates 0, 1 and 2), instead of Merge candidates 0, 1, 2, . . . , (MAX-1)). In another example, a partial procedure of FRUC mode can be skipped in the encoder if a certain condition is satisfied. In this case, instead of the conventional FRUC mode, which includes bi-lateral FRUC and template-matching FRUC, the simplified FRUC mode can have only bi-lateral FRUC. In yet another example, the simplified FRUC mode can have only template-matching FRUC.

In the proposed method, one or more Inter modes (or tools) or a portion of a certain Inter mode can be skipped or eliminated on the encoder side (or on both encoder and decoder sides) if a certain condition (denoted as COND_REDUOFF) is satisfied. In the following embodiments, the term "depth" can mean the CT depth or QT depth or BT depth or TT depth.

Embodiment 1: When the depth of current CU equals N, the condition is satisfied, where N is a pre-defined value.

Embodiment 2: When depth of current CU is larger than a threshold, the condition is satisfied.

Embodiment 3: When depth of current CU is smaller than a threshold, the condition is satisfied.

Embodiment 4: When the current CU size (CU size=CU width*CU height) is larger than a threshold, the condition is satisfied.

Embodiment 5: When the current CU size is smaller than a threshold, the condition is satisfied.

Embodiment 6: When the QP (control signal of quantization) value of current CU size is larger than a threshold, the condition is satisfied.

Embodiment 7: When the QP (control signal of quantization) value of current CU size is smaller than a threshold, the condition is satisfied.

Embodiment 8: When the depth of current CU equals N and current CU size is larger than a threshold, the condition is satisfied.

Embodiment 9: When the depth of current CU equals N and current CU size is smaller than a threshold, the condition is satisfied.

Embodiment 10: When the depth of current CU equals N and current CU QP is larger than a threshold, the condition is satisfied.

Embodiment 11: When the depth of current CU equals N and current CU QP is smaller than a threshold, the condition is satisfied.

Embodiment 12: When depth of current CU equals N and current CU temporal layer is larger than a threshold, the condition is satisfied.

Embodiment 13: When depth of current CU equals N and current CU temporal layer is smaller than a threshold, the condition is satisfied.

Embodiment 14: When depth of current CU equals N and current CU aspect ratio (width/height or height/width) is larger than a threshold, the condition is satisfied.

Embodiment 15: When depth of current CU equals N and current CU aspect ratio is smaller than a threshold, the condition is satisfied.

Embodiment 16: When the parent mode of current CU (i.e., the mode of parent block of coding-tree splitting) is Skip mode, the condition is satisfied.

Embodiment 17: When the parent mode of current CU (i.e., the mode of parent block of coding-tree splitting) is some certain mode, the condition is satisfied.

Embodiment 18: When current CU aspect ratio (width/height or height/width) is larger than a threshold, the condition is satisfied.

Embodiment 19: When current CU aspect ratio is smaller than a threshold, the condition is satisfied.

In addition to the embodiments listed above, the certain condition for turning-off some Inter tools can be the combination of the listed embodiments. For example, Embodiment 2 and Embodiment 4 can be combined, and the combined condition is "When depth of current CU is larger than a threshold" and/or "When current CU size (CU size=CU width*CU height) is larger than a threshold".

If the certain condition for turning-off some Inter tools is met, it can turn-off some Inter tools and/or reduce complexity of some other Inter tools. For example, if the condition of embodiment 14 is met, FRUC mode can be turned off and the Merge mode can be modified to have only 2 candidates to reduce the complexity of the Merge mode by reducing the candidate number for the Merge mode. In this case, the reduced complexity Merge mode is referred as a low-complexity Merge mode. For convenience, a reduced complexity Inter tool is referred as a low-complexity Inter tool. In another example, if the condition of Embodiment 15 is met, the FRUC mode can be reduced to only include the bilateral mode and the Merge mode can be modified to have only 2 candidates to reduce the complexity of the Merge mode. The FRUC in this case is referred as a low-complexity FURC.

In another embodiment, if the certain condition for turning-off some Inter tools is met (COND_REDUOFF being asserted), Inter tool A can be turned off depending on the RD cost of Inter tool B in the encoder. For example, FRUC mode can be turned off if the AMVP RD cost is lower than a threshold. In another example, FRUC mode can be turned off if the RDO cost of the low-complexity FRUC is lower than the RDO cost of low-complexity AMVP.

In another embodiment, if the certain condition for turning-off some Inter tools is met, in addition to turn-off some Inter tools and/or reduce some other Inter tools, the related syntax element can be eliminated (or saved) for improving coding gain. For example, for the condition that CT depth==3 and CU size>=4096, the FRUC mode and AMVP mode are turned off. Therefore, the syntax element of Merge mode and FRUC mode can be totally eliminated for any CU with condition of "CT depth==3, and CU size>=4096". In another example, for the condition that CT depth==3 and CU size>=4096, the Merge mode is modified to have only 2 candidates. In this case, the unary code encoding of Merge index in the conventional method can be modified to reduce the bits of Merge index.

The proposed method can be extended to turn off some Intra tools. If a certain condition is met, some Intra tools (e.g. Intra prediction, or other Intra tool) can be turned off and/or some other Intra tools can be reduced, such that the mode-flag (such as affine merge flag, LIC flag) can be eliminated for that CU or the mode-index (such as merge index) can be reduced for unary code.

Method 2: Skip Some Inter Mode According to Surrounding Condition or Current CU

Here the term "surrounding" means left and/or top neighbouring blocks of the current CU. This method firstly check the spatial surrounding Inter modes. To check the Inter mode of spatial surrounding CUs, it can count the histogram of the Inter modes of the CUs which is surrounding (i.e., left and/or top neighbouring of) the current CU according to one embodiment. In another embodiment, it counts the histogram of the Inter modes of minimum locks (e.g. smallest block 4×4, or other sizes by different system or different embodiment) which is surrounding (i.e., left and/or top neighbouring of) the current CU. In yet another embodiment, it counts the histogram of the Inter modes of surrounding CU or blocks or pixels.

After the counting (or forming histogram), if a certain Inter mode (e.g. FRUC mode) has the maximum number of occurrence among all Inter modes (such as Merge mode, AMVP mode, FRUC mode, or other Inter tools), this Inter mode can be designated as most_freq_inter_mode. Accordingly, some Inter modes can be turned off according to the most_freq_inter_mode. There are some embodiments as follows.

Embodiment 1: the Inter mode corresponding to most_freq_inter_mode can be turned off for the current CU.

Embodiment 2: the Inter mode which is not the mode of most_freq_inter_mode can be turned off for the current CU.

This method is not restricted to embodiments 1 and 2. In other embodiments, some Inter tools can be turned off and/or reduced according to most_freq_inter_mode.

This method can be added a size condition, in which the current CU size (CU width*CU height) larger than a pre-defined threshold or smaller than a pre-defined threshold.

Method 3: Skip Some Inter Mode According to Parent Mode Condition

In an encoder, for the current sub-block (e.g. CU), the Inter mode of its parent sub-block (e.g. CU) is checked during coding-tree splitting. If its parent sub-block (e.g. CU) is a certain Inter mode (denoted as inter_mode_parent), then the Inter mode that is equal to inter_mode_parent is turned off in the current CU according to embodiment 1. In embodiment 2, the Inter mode that is not equal to inter_mode_parent is turned off in the current CU. This method is not restricted to embodiments 1 and 2. According to this method, some Inter tools can be turned off and/or reduced according to inter_mode_parent.

The foregoing proposed methods for complexity reduction for coding-tree splitting structure associated with Inter mode can be implemented in encoders and/or decoders. For example, the proposed method can be implemented in an Inter prediction module of an encoder, and/or an Inter prediction module of a decoder.

Simplification of Coding Tree (CT) Structure

In existing practice, the maximum CT depth of binary tree (BT) splitting or triple tree (TT) splitting is up to 3. Allowing TT splitting will increase the complexity at the encoder side significantly. Some methods are proposed to reduce the computation complexity especially for some specific CT depth equal to X, where X is an integer greater than or equal to 0. In the following, X equal to 3 is used as an example for illustration purpose and CT splitting is terminated (or called skipped) at CT depth equal to 3 conditionally. In other words, the maximum CU depth of BT splitting or TT splitting will be up to 2 in some cases. In one embodiment, if CU size is larger than M×N, where M and N can be any integer such as 64, 128, 256, and so on, then CT splitting is terminated at CT depth equal to 3. The values of M and N can be predefined or signalled at the sequence level, picture level or slice level. Alternatively, the values of M and N are related to the video resolution or standard profile. In another embodiment, the condition to terminate or skip CT splitting for CT depth equal to 3 is based on the temporal layer ID of coded slices. The temporal layer is referring to the layer associated with the temporal structure of pictures (e.g. I, B and P pictures). For example, an I picture can be assigned to Temporal Layer=0 since the I picture does not refer to any other picture, and a B picture, which refer to more pictures directly and/or indirectly, can be assigned to the Temporal Layer with a larger value. If the temporal layer of current slice is equal to K, greater than L, or smaller than P, then CT splitting CT splitting is terminated at CT depth equal to 3. K, L, and P can be any integers, e.g. 2, 4, 6, and so on. In another embodiment, the condition to allow CT depth equal to 3 is based on the best predicted mode of current CU. If the best mode of current CU is Skip mode, then CT splitting is terminated at CT depth equal to 3. In another embodiment, for large quad-tree (QT) leaves or CUs with large size (e.g. 64×64, 128×128), the decision to allow CT depth equal to 3 is made based on the ratio of CU's width and height. For example, if the ratio of CU's width and height is smaller than T, then CT splitting is terminated at CT depth equal to 3. T can be any integers, e.g. 2, 4, 8, and so on. The values of T can be predefined or signalled at sequence level, picture level or slice level. Or the value of T is related to the video resolution or standard profile. In another embodiment, the condition to perform CT depth equal to 3 is based on the decision of CT depth equal to 1 or equal to 2. For example, if no TT splitting is used in the previous CT depth or the partition in CT depth equal to 1 is not TT, then CT depth equal to 3 is allowed. In another embodiment, the condition to terminate CT splitting at CT depth 3 is based on current slice QP. If current slice QP is larger than a pre-defined threshold, then skip CT depth equal to 3.

Furthermore, the proposed methods can be combined to make the decision of terminating CT depth equal to 3. For example, CT splitting is terminated at CT depth equal to 3 only when CU size is larger than M×N and the best mode of CU is Skip mode. These methods can be applied as an encoder only or be normative changes. If these methods are applied as normative changes, we can also benefit from some syntax saving for conditionally coding splitting flags on CT depth equal to 3.

Moreover, termination of CT splitting at CT depth equal to 3 can be applied on TT splitting only or BT splitting only. In other words, only terminate TT splitting or terminate BT splitting at CT depth equal to 3, and the remaining splitting type still can be applied at CT depth equal to 3.

The foregoing proposed methods can be implemented in encoders and/or decoders. For example, the proposed method can be implemented in a CU splitting process in an encoder, and/or a CU splitting process in a decoder.

Fast CT/CU Splitting

In another aspect of the present invention, several fast CU partition decision methods are disclosed for reducing video encoder complexity and also maintaining the coding efficiency. These methods can be designed as encoder-only fast CU partitioning methods, or with normative changes for saving signalling overhead. Details of these embodiment are described as follows.

Embodiment 1: Allow/Skip CU Partitioning Methods According to Weighted Neighbouring Sub-CUs Area The usage of a CU portioning method for the current CU is based on the weighted neighbouring sub-CUs area. The neighbouring sub-CUs can be the upper neighbouring sub- CUs or/and the left neighbouring sub-CUs. Besides, only the partitioning method or/and partition direction of the used CU partition methods are signalled.

In one example, if the current CU area is equal to or larger than the weighted neighbouring sub-CUs area, then only no partition and QT partitioning methods are used and BT/TT partitioning methods are not used. An example of adaptive block partition 1700 according to an embodiment of the present invention is shown in FIG. 17. As shown in FIG. 17, the current CU 1710 is marked by the slant-line filled area, and the eight 4×4 neighbouring sub-CUs 1720a and 1720b are marked by areas filled with dots. The upper four 4×4 neighbouring sub-CUs 1720a all belong to a 16×8 CU, and the left four 4×4 neighbouring sub-CUs 1720b belong to 8×8, 8×4 and 8×4 CUs. Then, the weighted neighbouring CU area, y, is calculated as:

$y=k\times x,$ $x=(4\times(16\times8)+2\times(8\times8)+(8\times4)+(8\times4))/8=88,$ $=>y=k\times88,$ In the above equations, k belongs to a real number and x is the average area of the neighboring sub-CUs. Therefore, if the current CU area is denoted as a and a≥y, then only no partition or QT partition can be selected to split the current CU into smaller CUs (i.e., sub-CUs).

In another embodiment, if the current CU area is equal to or larger than the weighted left sub-CUs area, then only no partition or QT partitioning can be used and BT/TT partitioning methods are not used. For example, as shown in FIG. 17, the weighted left sub-CUs area, y, is calculated as:

$y=k\times x,$ $x=(2\times(8\times8)+(8\times4)+(8\times4))/8=24,$ $=>y=k\times24,$ In the above equations, k is a real number and x is the average area of the left neighbouring sub-CUs. Therefore, if the current CU area is denoted as a and a≥y, then only no partition or QT partitioning can be selected to split the current CU into smaller CUs.

In still another embodiment, if the current CU area is equal to or larger than the weighted upper sub-CUs area, then only no partition or QT partitioning can be used and BT/TT partitioning methods are not used. For example, as shown in FIG. 17, the weighted upper sub-CU area, y, is calculated as:

$y=k\times x,$ $x=(4\times(16\times8))/8=64,$ $=>y=k\times64,$

In the above equations, k is a real number and x is the average area of the upper neighbouring sub-CUs. Therefore, if the current CU area is denoted as a and a≥y, then only no partition or QT partitioning can be selected to split the current CU into smaller CUs.

In still another embodiment, only the no split partitioning method is used if the current CU area is equal to or smaller than the weighted neighbouring sub-CUs area. For example, as shown in FIG. 3, the weighted neighbouring CU area, y, is calculated as:

$y=k\times x,$ $x=(4\times(16\times8)+2\times(8\times8)+(8\times4)+(8\times4))/8=88,$ $=>y=k\times88,$ In the above equations, k is to a real number and x is the average area of the neighboring sub-CUs. If the current CU area is denoted as a and a≤y, then only the no partitioning method is used.

In still another embodiment, only the no split partitioning method is used if the current CU area is equal to or smaller than the weighted left sub-CUs area. For example, as shown in FIG. 17, the weighted neighbouring CU area, y, is calculated as:

$y=k\times x,$ $x=(2\times(8\times8)+(8\times4)+(8\times4))/8=24,$ $=>y=k\times24,$ In the above equations, k is a real number and x is the average area of the left neighbouring sub-CUs. If the current CU area is denoted as a and a≤y, then only no CU partitioning method is used.

In still another embodiment, only the no split partitioning method is used if the current CU area is equal to or smaller than the weighted upper sub-CUs area. For example, as shown in FIG. 17, the weighted neighbouring CU area, y, is calculated as:

$y=k\times x,$ $x=(4\times(16\times8))/8=64,$ $=>y=k\times64,$

In the above equations, k is a real number and x is the average area of the upper neighbouring sub-CUs. If the current CU area is denoted as a and a≤y, then only no CU partitioning method is used.

Embodiment 2: Skip CU Partitioning Methods According to Weighted Side Length Ratio All available CU partitioning methods are classified into two sets, and only one CU partition set is used for splitting the current CU into smaller CUs if the weighted side length ratio is in a given range. The side length ratio can be the weighted average height of the left neighbouring CUs over the current CU height, or the weighted average width of the upper neighbouring CUs over the current CU width. Besides, if the current CU satisfies the side length ratio constraint, then only the partitioning method or/and partition direction of the selected CU partition set are signalled.

In one embodiment, as shown in FIG. 17, the side length ratio is the average width of the upper neighbouring CUs over the current CU width, a, is calculated as:

$$a = \frac{(16+16+16+16)/4}{16} = 1.$$

If a≥n, then only horizontal BT/TT CU partitioning methods are used to split the current CU into smaller CUs, where n is a real number.

In another embodiment, as shown in FIG. 17, the side length ratio is the average height of the left neighbouring CUs over the current CU width, b, is calculated as:

$$b = \frac{(8+8+4+4)/4}{16} = 0.375.$$

If b≥q, then only vertical BT/TT CU partitioning methods are used to split the current CU into smaller CUs, where q is a real number.

Embodiment 3: Skip CU Partitioning Methods According to Current Best Sub-CUs/CUs Partitioning Direction Before testing a CU partitioning method (which is denoted as P), if the current best CU partitioning directions are not the same as the partitioning direction of P and its sub-CUs are not further split in direction of P, then the test of P is skipped.

In one embodiment, if the current best CU partitioning method is horizontal BT or TT split, and its top-left sub-CU and bottom-right sub-CU are both further split by horizontal BT or TT partitioning method, then the test of the vertical BT/TT partitioning methods are skipped.

In another embodiment, if the current best CU partitioning method is vertical BT or TT split, and its top-left sub-CU and bottom-right sub-CU are both further split by vertical BT or TT partitioning method, then the test of the horizontal BT/TT partitioning methods are skipped.

Embodiment 4: Skip CU Partitioning Methods According to Early Testing the CU Partitioning Methods in the Other Split Direction Before testing a CU partitioning method (denoted as P), if the current best CU partitioning direction is not the same as P, then other CU partitioning methods with the same partitioning direction of the current best CU partitioning method are tested earlier than P. After that, if the current best CU partitioning direction is still not the same as P and more than a percentage of sub-CUs of the current best CU are not further split, then the test of P is skipped.

In one embodiment, if the current best CU partitioning method is vertical BT split, then the vertical TT partitioning method is tested earlier than the horizontal TT partitioning method. After that, if the current best is changed to vertical TT and the middle sub-CU is not further spit, the test of horizontal TT partitioning method is skipped.

In another embodiment, if the current best CU partitioning method is horizontal BT split, then the horizontal TT partitioning method is tested earlier than the vertical TT partitioning method. After that, if the current best is changed to horizontal TT and the middle sub-CU is not further spit, the test of vertical TT partitioning method is skipped.

Embodiment 5: Skip CU Partitioning Methods According to Temporary Best Split Cost in Each Partitioning Set All available CU partitioning methods are classified into two sets, and these two sets are $P_1=$ and $P_2$. The classification of partitioning methods can be based on partitioning direction or partitioning type. Suppose only partial partitioning methods in $P_1$ and $P_2$ has been tested, and the best split cost of the tested partitioning methods in $P_1$ and $P_2$ is $c_{P_1}$ and $c_{P_2}$. If $c_{P_1} \geq w \times c_{P_2}$, then the remaining CU partition modes in $P_1$ are skipped. Or if $c_{P_2} \geq w \times c_{P_1}$, then the remaining CU partition modes in $P_2$ are skipped.

In one embodiment, the partitioning methods are classified by split direction, and these two partitioning sets are {Horizontal BT, Horizontal ABT, Horizontal TT} and {Vertical BT, Vertical ABT, Vertical TT}. The ABT is abbreviation for Asymmetric BT. If {Horizontal BT, Horizontal ABT} and {Vertical BT, Vertical ABT} have been tested and the best split cost for these two sets are $c_{P_1}$ and $c_{P_2}$. If $c_{P_1} \geq w \times c_{P_2}$, then the split test of the horizontal TT partitioning method is skipped.

In another embodiment, the partitioning methods are classified by the split type, and these two partitioning sets are {Horizontal TT, Vertical TT, Horizontal ABT, Vertical ABT} and {Horizontal BT, Vertical BT}. If {Horizontal BT, Vertical BT} and {Horizontal TT, Vertical TT} have been tested and the best split cost for these two sets are $c_{P_1}$ and $c_{P_2}$. If $c_{P_1} \geq w \times c_{P_2}$, then the split tests of the horizontal/vertical ABT partitioning methods are skipped.

Embodiment 6: Skip CU Partitioning Methods According to Temporary Best Split Cost Among Earlier Partitioning Methods Assume the number of total available CU partitioning methods for current CU is M, and N out of M partitioning methods have been tested and the split cost for these N partitioning methods are denoted as $\{c_1, c_2, c_3, \ldots, c_N\}$. Suppose the current best CU split cost is $c_{best}$ $$c_{best} = \min_j(c_1, c_2, c_3, \ldots, c_N). \text{ If } c_i > w \times c_{best},$$

(where i=1, . . . , N and i≠j,) and the current best CU partition method is no split, then the split tests of the remaining (M−N) CU partitioning methods are skipped.

For example, assume the available CU partitioning methods are {No Split, Horizontal BT, Vertical BT, QT, Horizontal TT, and Vertical TT}. Suppose No Split, Horizontal BT, Vertical BT, and QT are tested, and the current best CU partition method is the no split partition type. If the weighted cost of the no split method is smaller than the cost of Horizontal BT, Vertical BT, and QT, then the split tests of horizontal TT and vertical TT are skipped.

Embodiment 7: Skip CU Partitioning Methods by Comparing to Costs of Upper Depth CU According to this embodiment, the CU partitioning method is skipped early once the accumulated split cost is equal to or larger than any best split cost of each split depth. Accumulated split cost is defined as the summation of the current coded sub-CUs and the parent coded CUs in the upper split depth. For example, FIG. 18A shows a CTU that is still under the encoding process. The currently encoded CU 1810 is demoted by the area filled with slant lines, and the fully coded CUs are indicated by the area enclosed by thick dash lines. For the currently encoded CU, there are 4 parent blocks from the split depth 0, 1, 2, 3 which are indicated by corresponding bold solid lines (i.e., 1836, 1834, 1832 and 1830 respectively) in FIG. 18B-FIG. 18E, respectively. Assume that the current testing method is the horizontal BT partitioning method, and the first sub-CU marked as "A" is already coded. Before coding the second sub-CU marked as "B", if the split cost of "A" plus the cost of other coded CUs marked by backslash-lines is equal to or larger than the weighted split cost of the parent blocks of each split depth, then the CU partitioning method is early skipped. For example, in FIG. 18B, other coded CUs correspond to null (i.e., no other coded CUs being used) for splitting depth-3 block 1830 as indicated by a thick-line square. In FIG. 18C, other coded CUs correspond to areas filled with backlash-lines above area A for splitting depth-2 block 1832 as indicated by a thick-line rectangle. In FIG. 18D, other coded CUs correspond to areas filled with backlash-lines above area A for splitting depth-1 block 1834 as indicated by a thick-line square. In FIG. 18E, other coded CUs correspond to areas filled with backlash-lines for splitting depth-0 block 1836 as indicated by a thick-line square.

Embodiment 8: Reuse Previous Same Position and Same Size CU Split Decision

A CU can be encoded many times by different CU partitioning methods or in different CU split depths. Due to the spatial position, CU size, or even the neighbours of the CU is not changed, the CU split decision can be reused once the CU is revisited.

In one example, only the partitioning methods have less split cost than the weighted best split cost will be tested when the CU is revisited.

In another embodiment, when the CU is revisited, the partitioning method has the best split cost will always be tested, and the partitioning method has the second best split cost that is less than the weighted best split cost will also be tested. Other tested partitioning methods will be skipped. Note that, the partitioning method that does not test at the first-time being encoded CU can be tested at the revisited time.

Figure 19:
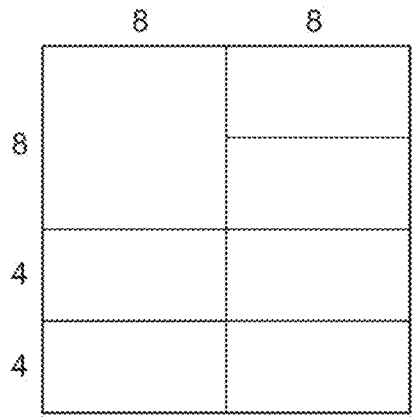
FIG. 19 illustrates an example of calculating weighted average area of the current sub-CUs according to an embodiment of the present invention, where each sub-CU size is 4×4.

Embodiment 9: Skip CU Partitioning Methods According to the Weighted Average Area of Current Sub-CUs The CU partitioning methods are skipped when the weighted average area of the current sub-CUs is equal to or smaller than $TH_1$, and the current CU area/size is also equal to or larger than $TH_2$. For example, if the current best CU is split as shown in FIG. 19, and each sub-CU size is 4×4. Then the weighted average area of the current sub-CUs, a, is calculated as:

$$a = \frac{(1 \times (4 \times (8 \times 8)) + 6 \times (2 \times (8 \times 4)))}{16} = 40.$$

If $a \leq TH_1$ and the current CU area/size is equal to or larger than $TH_2$, then the following non-tested CU partitioning methods are skipped.

Embodiment 10: Skip CU Partitioning Methods According to QT Partitioning Results The CU partitioning methods are skipped when the best CU's QT depth is deeper than the current CU, and the current CU area is equal to or larger than a threshold. In one example, the TT partitioning methods are skipped when the best CU's QT depth is deeper than the current CU, and the current CU area is equal to or larger than 16384.

Figure 20:
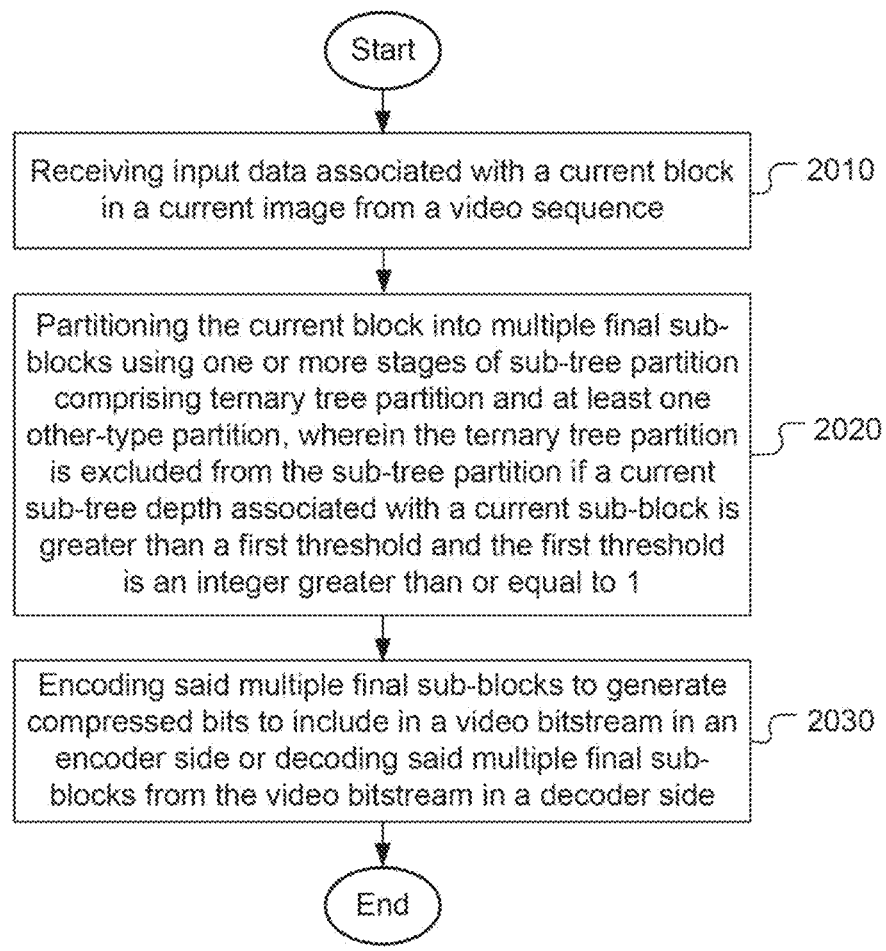
FIG. 20 illustrates a flowchart of an exemplary coding system with constraints on coding-tree partition according to an embodiment of the present invention.

FIG. 20 illustrates a flowchart of an exemplary coding system with constraints on coding-tree partition according to an embodiment of the present invention. The steps shown in the flowchart, as well as other following flowcharts in this disclosure, may be implemented as program codes executable on one or more processors (e.g., one or more CPUs) at the encoder side and/or the decoder side. The steps shown in the flowchart may also be implemented based hardware such as one or more electronic devices or processors arranged to perform the steps in the flowchart. According to this method, input data associated with a current block in a current image from a video sequence is received in step 2010. In step 2020, the current block is partitioned into multiple final sub-blocks using one or more stages of sub-tree partition comprising ternary partition and at least one other-type partition, wherein the ternary partition is excluded from the sub-tree partition if a current sub-tree depth associated with a current sub-block is greater than a first threshold and the first threshold is an integer greater than or equal to 1. In step 2030, said multiple final sub-blocks is encoded to generate compressed bits to include in a video bitstream in an encoder side or said multiple final sub-blocks is decoded from the video bitstream in a decoder side.

Figure 21:
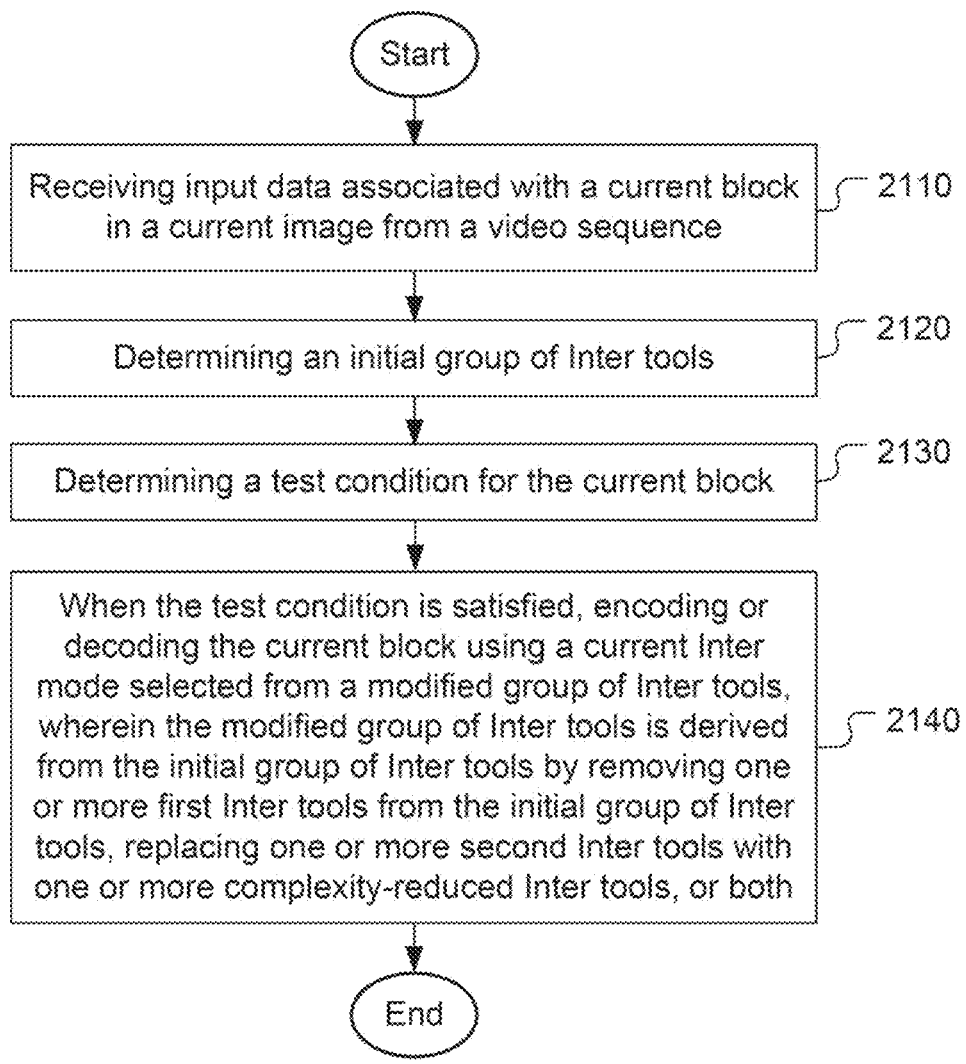
FIG. 21 illustrates a flowchart of an exemplary coding system with complexity reduced Inter mode according to an embodiment of the present invention.

FIG. 21 illustrates a flowchart of an exemplary coding system with complexity reduced Inter mode according to an embodiment of the present invention. According to this method, input data associated with a current block in a current image from a video sequence is received in step 2110. An initial group of Inter tools is determined in step 2120. A test condition is then determined for the current block in step 2130. In step 2140, when the test condition is satisfied, the current block is encoded or decoded using a current Inter mode selected from a modified group of Inter tools, wherein the modified group of Inter tools is derived from the initial group of Inter tools by removing one or more first Inter tools from the initial group of Inter tools, replacing one or more second Inter tools with one or more complexity-reduced Inter tools, or both.

Figure 22:
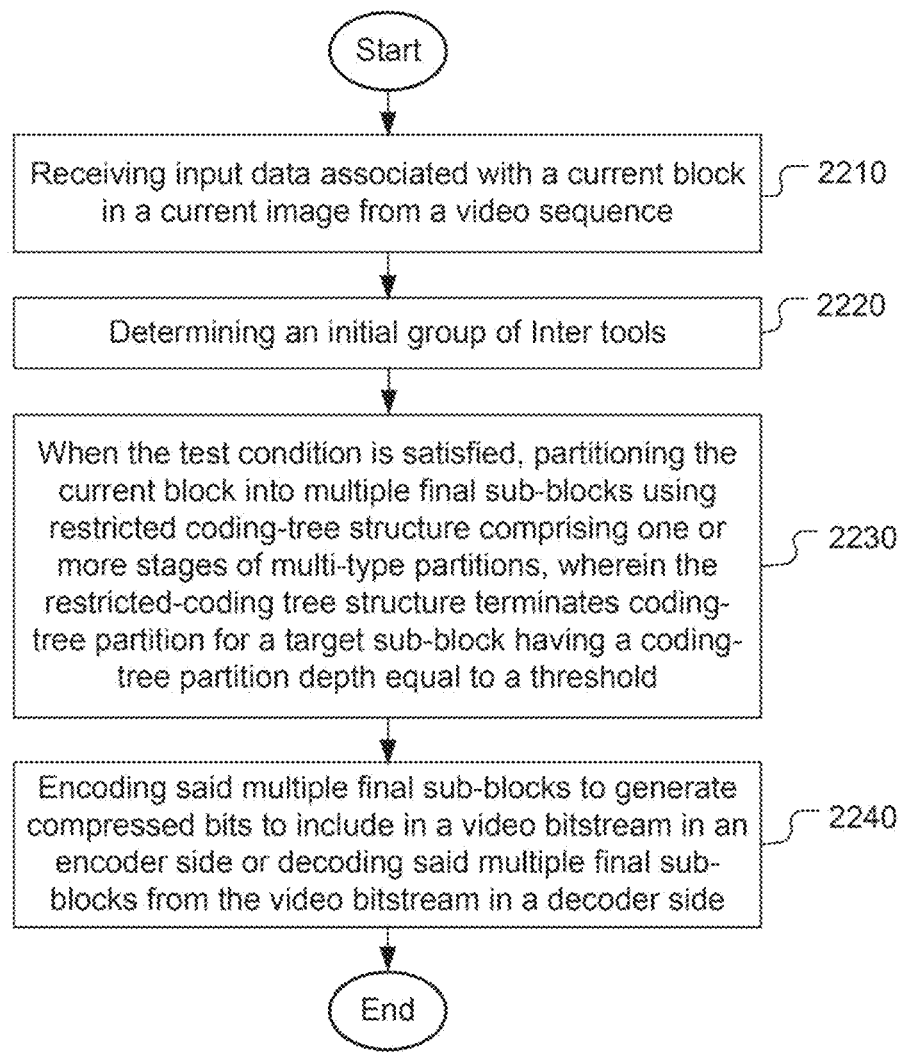
FIG. 22 illustrates a flowchart of another exemplary coding system with constraints on coding-tree partition according to an embodiment of the present invention.

FIG. 22 illustrates a flowchart of another exemplary coding system with constraints on coding-tree partition according to an embodiment of the present invention. According to this method, input data associated with a current block in a current image from a video sequence is received in step 2210. A test condition is determined for the current block in step 2220. In step 2230, when the test condition is satisfied, the current block is partitioned into multiple final sub-blocks using restricted coding-tree structure comprising one or more stages of multi-type partitions, wherein the restricted-coding tree structure terminates coding-tree partition for a target sub-block having a coding-tree partition depth equal to a threshold. In step 2240, said multiple final sub-blocks is encoded to generate compressed bits to include in a video bitstream in an encoder side or said multiple final sub-blocks is decoded from the video bitstream in a decoder side.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding, the method comprising:
   receiving input data associated with a current block in a current image from a video sequence;
   partitioning the current block into multiple final sub-blocks using one or more stages of a sub-tree partition comprising ternary tree partitioning and at least one other-type of partitioning, wherein all ternary tree partitions are excluded from the sub-tree partition if a current sub-tree depth associated with a current sub-block resulting from a partition at the current sub-tree depth is greater than a first threshold and the first threshold is an integer greater than or equal to 1, wherein the first threshold corresponds to a maximum allowed sub-tree partitioning depth minus a second threshold, wherein the second threshold is an integer smaller than the maximum allowed sub-tree partitioning depth and greater than or equal to 0;
   wherein a value of the second threshold is dependent on whether the current image is in an Intra slice or an Inter slice; and
   encoding said multiple final sub-blocks to generate compressed bits to include in a video bitstream in an encoder side or decoding said multiple final sub-blocks from the video bitstream in a decoder side.

2. The method of claim 1, wherein said at least one other-type of partitioning comprises quadtree partition, binary-tree partition or both.

3. The method of claim 1, wherein the current block corresponds to one Coding Tree Unit and each of the multiple final sub-blocks corresponds to one Coding Unit, Prediction Unit or Transform Unit.

4. The method of claim 1, wherein the first threshold is inferred at the decoder side.

5. The method of claim 1, wherein an indicator for indicating whether the ternary tree partition is selected for the current sub-block is omitted if the current sub-tree depth associated with the current sub-block is greater than the first threshold.

* * * * *